(12) United States Patent
Kiss et al.

(10) Patent No.: US 8,399,586 B2
(45) Date of Patent: Mar. 19, 2013

(54) PROCESS FOR FEEDING ETHYLENE TO POLYMERIZATION REACTORS

(75) Inventors: Gabor Kiss, Hampton, NJ (US); Robert Patrick Reynolds, Jr., Clinton, NJ (US); John W. Chu, Neshanic Station, NJ (US); James Richardson Lattner, LaPorte, TX (US); Gary D. Mohr, Houston, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 676 days.

(21) Appl. No.: 12/584,338

(22) Filed: Sep. 3, 2009

(65) Prior Publication Data

US 2010/0063338 A1 Mar. 11, 2010

Related U.S. Application Data

(60) Provisional application No. 61/191,136, filed on Sep. 5, 2008.

(51) Int. Cl.
| | |
|---|---|
| *C08F 2/00* | (2006.01) |
| *C08F 4/00* | (2006.01) |
| *C08F 36/00* | (2006.01) |
| *C08F 110/06* | (2006.01) |
| *C08F 110/02* | (2006.01) |

(52) U.S. Cl. .......... 526/348; 526/352; 526/64; 526/335; 526/351; 526/89; 422/132

(58) Field of Classification Search .................. 526/348, 526/352, 64, 335, 351, 89; 422/132
See application file for complete search history.

(56) References Cited

U.S. PATENT DOCUMENTS

| | | | |
|---|---|---|---|
| 3,341,503 A | 9/1967 | Paige et al. | |
| 5,608,019 A | 3/1997 | Cheruvu et al. | |
| 5,705,577 A | 1/1998 | Rossi et al. | |
| 5,811,379 A | 9/1998 | Rossi et al. | |
| 5,977,251 A | 11/1999 | Kao et al. | |
| 6,388,016 B1 | 5/2002 | Abdou-Sabet et al. | |
| 6,423,791 B1 * | 7/2002 | Kral ............................ 526/68 | |
| 6,569,965 B2 | 5/2003 | Markel et al. | |
| 7,345,139 B2 | 3/2008 | DeBruin | |

* cited by examiner

*Primary Examiner* — William Cheung
(74) *Attorney, Agent, or Firm* — Robert A. Migliorini

(57) ABSTRACT

A process for feeding ethylene into a polymerization system includes providing a low-pressure ethylene stream, one or more low-pressure $C_3$ to $C_{20}$ monomer streams, an optional low-pressure inert solvent/diluent stream, and one or more reactors; metering the low-pressure ethylene stream, the one or more low-pressure $C_3$ to $C_{20}$ monomer streams, and the optional low-pressure inert solvent/diluent stream; blending the metered low-pressure ethylene stream, the metered one or more low-pressure $C_3$ to $C_{20}$ monomer streams, and the metered low-pressure optional inert solvent/diluent stream to form an ethylene-carrying low-pressure blended liquid feed stream; pressurizing the ethylene-carrying low-pressure blended liquid feed stream to the polymerization system pressure with one or more high-pressure pumps to thrm an ethylene-carrying high-pressure blended reactor feed stream; and feeding the ethylene-carrying high-pressure blended reactor feed stream to the one or more reactors.

57 Claims, 5 Drawing Sheets

Basic phase diagram for mixture of propylene monomer with polymer

PROCESS FOR FEEDING ETHYLENE TO POLYMERIZATION REACTORS

CROSS-REFERENCE TO RELATED APPLICATIONS

This is a Non-Provisional Application that claims priority to U.S. Provisional Application 61/191,136 filed Sep. 5, 2008, which is herein incorporated by reference in its entirety.

BACKGROUND

1. Field

The present disclosure relates to the field of olefin polymerization. It more particularly relates to processes for feeding ethylene monomer into one or more polymerization reactors. Still more particularly, the present disclosure relates to processes for feeding ethylene monomer dissolved in one or more $C_3$-$C_{20}$ monomers and/or $C_4$-$C_{20}$ saturated aliphatic or aromatic hydrocarbons, and combinations thereof to improve compositional control of the reactor input feed streams, and to reduce the investment and operation costs associated with ethylene feeding in the production of ethylene-containing polymers and polymer blends.

2. Description of the Related Art

In prior art processes for making copolymers of ethylene and $C_3$-$C_{20}$ higher olefins in polymerization systems operating in a liquid phase or a supercritical phase, ethylene is typically delivered to the reactor in gaseous form by compressors. Such compressors are expensive to install and operate, particularly in high-pressure polymerization processes operating above 100 atm (1450 psi), or above 350 atm (5075 psi). The $C_3$-$C_{20}$ higher olefins, such as, for example, propylene, butenes, butene-1, butene-2, isobutylene, pentene-1, hexene-1, heptene-1, octene-1, decene-1, styrene, o-methylstyrene, p-methylstyrene, 1,3-butadiene, 1,5-hexadiene, 1,7-octadiene, 1,9-decadiene, divinylbenzene, dicyclopentadiene, norbornene, norbornadiene, vinylnorbornene, ethylidenenorbornene, etc., are typically delivered to the reactor in liquid form by a pump. The precise control of feed composition, i.e., the ratio of ethylene to the $C_3$-$C_{20}$ olefin components, is typically difficult due to the lack of flow control devices capable of operating at high pressures, particularly above 100 atm (1450 psi), or above 350 atm (5075 psi). The separate feeding of ethylene by one or more compressors also lacks flexibility in terms of feed composition for allowing both low (0.1-5.0 wt %) and high (up to 70 wt %) ethylene contents in the feed on an ethylene/(ethylene+higher olefin) basis. Delivering ethylene separately to the reactor by compressors also increases capital and operating cost.

Hence, a need exists for an improved process for feeding ethylene monomer to one or more reactors operating in a liquid phase or a supercritical phase to allow for improved compositional control and reduced capital and operating costs in the production of ethylene-containing copolymers.

SUMMARY

Processes for feeding ethylene into a polymerization system operating in a liquid phase or supercritical phase are provided.

According to the present disclosure, an advantageous process for feeding ethylene into a polymerization system operating in a liquid phase or supercritical phase comprises: providing a low-pressure ethylene stream, one or more low-pressure $C_3$ to $C_{20}$ monomer streams, an optional low-pressure inert solvent/diluent stream, and one or more reactors configured in parallel, in series, or a combination thereof; metering the low-pressure ethylene stream, the one or more low-pressure $C_3$ to $C_{20}$ monomer streams, and the optional low-pressure inert solvent/diluent stream; blending the metered low-pressure ethylene stream, the metered one or more low-pressure $C_3$ to $C_{20}$ monomer streams, and the metered low-pressure optional inert solvent/diluent stream to form an ethylene-carrying low-pressure blended liquid feed stream; pressurizing the ethylene-carrying low-pressure blended liquid feed stream to the polymerization system pressure with one or more high-pressure pumps to form an ethylene-carrying high-pressure blended reactor feed stream; and feeding the ethylene-carrying high-pressure blended reactor feed stream to the one or more reactors configured in parallel, in series, or a combination thereof.

A further aspect of the present disclosure relates to an advantageous process for feeding ethylene into a polymerization system operating in a liquid phase or supercritical phase comprises: providing a low-pressure ethylene stream, one or more low-pressure $C_3$ to $C_{20}$ monomer streams, a low-pressure recycle stream, an optional low-pressure inert solvent/diluent stream, and one or more reactors configured in parallel, in series, or a combination thereof; metering the low-pressure ethylene stream, the one or more low-pressure $C_3$ to $C_{20}$ monomer streams, the low-pressure recycle stream, and the optional low-pressure inert solvent/diluent stream; blending the metered low-pressure ethylene stream, the metered one or more low-pressure $C_3$ to $C_{20}$ monomer streams, the metered low-pressure recycle stream and the metered optional inert solvent/diluent stream to form a ethylene-carrying low-pressure blended liquid feed stream; pressurizing the ethylene-carrying low-pressure blended liquid feed stream to the polymerization system pressure with one or more high-pressure pumps to form an ethylene-carrying high-pressure blended reactor feed stream; and feeding the ethylene-carrying high-pressure blended reactor feed stream to the one or more reactors configured in parallel, in series, or a combination thereof.

These and other features and attributes of the disclosed processes for feeding ethylene into a polymerization system operating in a liquid phase or supercritical phase and their advantageous applications and/or uses will be apparent from the detailed description that follows, particularly when read in conjunction with the figures appended hereto.

BRIEF DESCRIPTION OF THE DRAWINGS

To assist those of ordinary skill in the relevant art in making and using the subject matter hereof, reference is made to the appended drawings, wherein.

DEFINITIONS

For purposes of this disclosure and the claims thereto.

A catalyst system is defined to be the combination of one or more catalyst precursor compounds and one or more activators. Note that although themselves are not catalytically active (need to be combined with an activator to become active), the catalyst precursor compounds are often referred to as catalysts in the art of polymerization. Any part of the catalyst system can be optionally supported on solid particles, in which case the support is also part of the catalyst system.

Dense fluids are defined as fluid media in their liquid or supercritical state with densities greater than 300 kg/m$^3$. Note that gas-phase fluids are excluded from the group of dense fluids.

Figure 5:
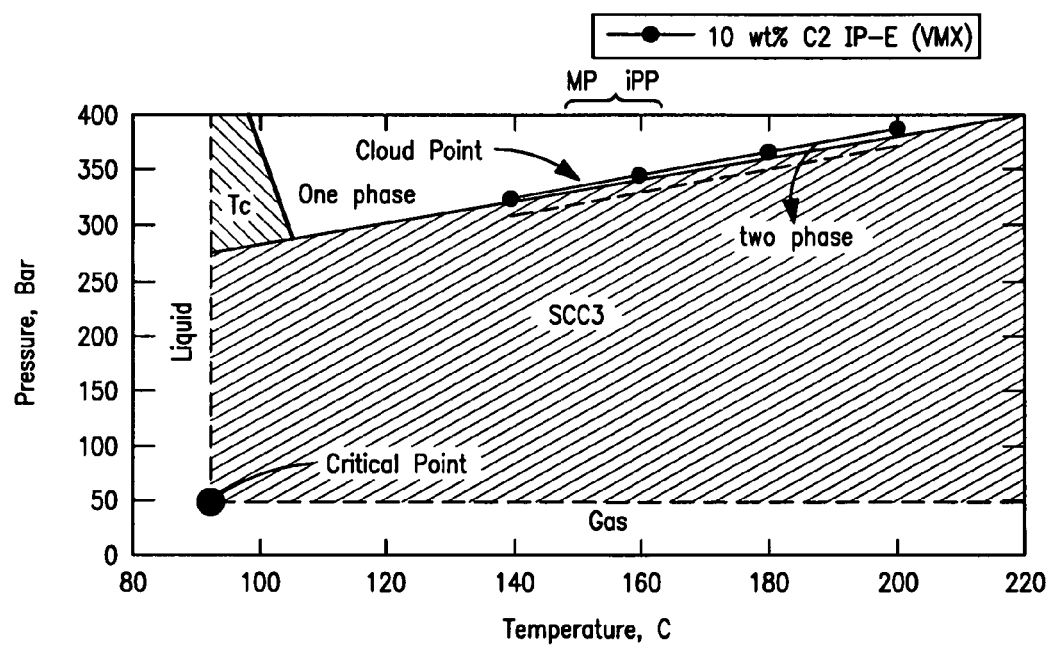
FIG. 5 presents a basic phase diagram for mixture of propylene monomer with selected polymers (isotactic polypropylene—IPP, syndiotactic polypropylene—sPP, atactic polypropylene—aPP, or propylene-ethylene copolymer).

Solid-fluid phase transition temperature is defined as the temperature at which a solid polymer phase separates from the polymer-containing dense fluid medium at a given pressure. Note that the solid-fluid phase transition temperature is indicated by the crystallization temperature line in FIG. 5. Note also that in polymer-solvent (the solvent could be the dense fluid monomer itself or monomer-inert solvent blends) systems the crystallization and melting temperatures (the latter defined as the temperature at which a solid polymer dissolves in the surrounding dense fluid medium) are often not the same. In fact, the dissolution of solid polymers typically requires significantly higher temperatures than the solid-fluid phase transition temperature. The solid-fluid phase transition temperature can be determined by temperature reduction starting from temperatures at which the polymer is fully dissolved in the dense fluid medium. At the onset of the formation of a solid polymer phase, the homogeneous fluid medium becomes turbid, which can be observed by eye or can be detected by shining a laser through the medium and detecting the sudden increase of light scattering as described in J. Vladimir Oliveira, C. Dariva and J. C. Pinto, Ind. Eng, Chem. Res. 29 (2000) 4627.

Solid-fluid phase transition pressure (crystallization pressure) is defined as the pressure at which a solid polymer phase separates from the polymer-containing fluid medium at a given temperature. The solid-fluid phase transition pressure can be determined by pressure reduction at constant temperature starting from pressures at which the polymer is fully dissolved in the fluid reaction medium. At the onset of the formation of a solid polymer phase, the homogeneous fluid medium becomes turbid, which can be observed by eye or can be detected by shining a laser through the medium and detecting the sudden increase of light scattering as described in J. Vladimir Oliveira, C. Dariva and J. C. Pinto, Ind. Eng, Chem. Res. 29 (2000) 4627. The solid-fluid phase transition pressure is often referred to in the art of polymer physics as the cloud point. The cloud point, thus is also defined as the pressure below which, at a given temperature, the polymer-containing homogeneous fluid medium becomes turbid upon pressure reduction at constant temperature as described in J. Vladimir Oliveira, C. Dariva and J. C. Pinto, Ind. Eng, Chem. Res. 29 (2000) 4627. For purposes of this disclosure and the claims thereto, the cloud point is measured by shining a helium laser through the selected polymerization system in a cloud point cell onto a photocell and recording the pressure at the onset of rapid increase in light scattering for a given temperature.

A higher α-olefin is defined as an α-olefin having four or more carbon atoms.

Polymerization encompasses any polymerization reaction such as homopolymerization and copolymerization.

Copolymerization encompasses any polymerization reaction of two or more monomers.

The new numbering scheme for the Periodic Table Groups is used as published in CHEMICAL AND ENGINEERING NEWS, 63(5), 27 (1985).

When a polymer is referred to as comprising an olefin, the olefin present in the polymer is the polymerized form of the olefin.

An oligomer is defined to be compositions having 2-75 monomer units.

A polymer is defined to be compositions having 76 or more monomer units.

A series reactor cascade (also referred to as series reactor configuration or reactors in series) includes two or more reactors connected in series, in which the effluent of an upstream reactor is fed to the next reactor downstream in the reactor cascade. Besides the effluent of the upstream reactor(s), the feed of any reactor can be augmented with any combination of additional monomer, catalyst, scavenger, or solvent fresh or recycled feed streams.

Reactor train or reactor branch or reactor leg refers to a single polymerization reactor or to a group of polymerization reactors. If the reactor train contains more than one reactor, the reactors are arranged in a series configuration within the train. The need for having more than one reactor in a reactor train may, for example, arise when an in-line blend component cannot be produced at the desired rate economically in a single reactor but there could be also reasons related to blend component quality, such as molecular weight or composition distribution, etc. Since a reactor train can comprise multiple reactors and/or reactor zones in series, the single blend component produced in a reactor train may itself be a polymer blend of polymeric components with varying molecular weights and/or compositions. However, in order to simplify the description of different embodiments of the processes disclosed herein, the polymeric product of a reactor train is referred to simply as blend component or polymeric blend component regardless of its molecular weight and/or compositional dispersion. For the purpose of defining the process of the present disclosure, parallel reactors will be considered as separate reactor trains even if they produce essentially the same in-line blend component. Also, spatially separated, parallel reaction zones that do not exchange or mix reaction mixtures by, for example, pump-around loops, or by other recirculation methods, will be considered as separate parallel reactor trains even when those parallel zones are present in a common shell and fall within the in-line blending process disclosed herein.

Reactor bank refers to the combination of all polymerization reactors in the polymerization section of the in-line polymer blending process disclosed herein. A reactor bank may comprise one or more reactor trains.

A parallel reactor configuration includes two or more reactors or reactor trains connected (also referred to as fluidly connected) in parallel. A reactor train, branch, or leg may include one reactor or alternatively more than one reactor configured in a series configuration. For example, a reactor train may include two, or three, or four, or more reactors in series. The entire parallel reactor configuration of the polymerization process disclosed herein, i.e., the combination of all parallel polymerization reactor trains forms the reactor bank.

Polymerization system is defined to be the monomer(s) plus monomer(s) plus polymer(s) plus optional inert solvent(s)/diluent(s) plus optional scavenger(s). Note that for the sake of convenience and clarity, the catalyst system is addressed separately in the present discussion from other components present in a polymerization reactor. In this regard, the polymerization system is defined here narrower than customary in the art of polymerization that typically considers the catalyst system as part of the polymerization system. In the current definition, the mixture present in the polymerization reactor and in its effluent is composed of the polymerization system plus the catalyst system.

A homogeneous polymerization system contains all of its components in a single phase dispersed and mixed on a molecular scale. In our discussions, homogeneous polymerization systems are meant to be in their dense fluid (liquid or supercritical) state. Note that our definition of the polymerization system does not include the catalyst system, thus the catalyst system may or may not be homogeneously dissolved in the polymerization system. A homogeneous system may have regions with concentration gradients, but there would be no sudden, discontinuous changes of composition on a micrometer scale within the system as it is the case when, for example, solid polymer-containing particles are suspended in a dense fluid. In practical terms, a homogeneous polymerization system has all of its components in a single dense fluid phase. Apparently, a polymerization system is not homogeneous when it is partitioned to more than one fluid phase or to a fluid and a solid phase. The homogeneous fluid state of the polymerization system is represented by the single fluid (liquid or supercritical fluid) region in its phase diagram.

Pure substances, including all types of hydrocarbons, can exist in either a subcritical, or supercritical state, depending on their temperature and pressure. To be in the supercritical state, a substance must have a temperature above its critical temperature (Tc) and a pressure above its critical pressure (Pc). Mixtures of hydrocarbons, including mixtures of monomers, polymers, and optionally inert solvents, have pseudo-critical temperatures (Tc) and pseudo-critical pressures (Pc), which for many systems can be approximated by mole-fraction-weighted averages of the corresponding critical properties (Tc or Pc) of the mixture's components. Mixtures with a temperature above their pseudo-critical temperature and a pressure above their pseudo-critical pressure will be said to be in a supercritical state or phase, and the thermodynamic behavior of supercritical mixtures will be analogous to supercritical pure substances. For purposes of this disclosure, the critical temperatures (Tc) and critical pressures (Pc) of certain pure substances relevant to the current disclosure are those that found in the HANDBOOK OF CHEMISTRY AND PHYSICS, David R. Lide, Editor-in-Chief, 82nd edition 2001-2002, CRC Press, LLC. New York, 2001. In particular, the Tc and Pc of selected substances are:

| Name | Tc (K) | Pc (MPa) | Name | Tc (K) | Pc (MPa) |
|---|---|---|---|---|---|
| Hexane | 507.6 | 3.025 | Propane | 369.8 | 4.248 |
| Isobutane | 407.8 | 3.64 | Toluene | 591.8 | 4.11 |
| Ethane | 305.3 | 4.872 | Methane | 190.56 | 4.599 |
| Cyclobutane | 460.0 | 4.98 | Butane | 425.12 | 3.796 |
| Cyclopentane | 511.7 | 4.51 | Ethylene | 282.34 | 5.041 |
| 1-butene | 419.5 | 4.02 | Propylene | 364.9 | 4.6 |
| 1-pentene | 464.8 | 3.56 | Cyclopentene | 506.5 | 4.8 |
| Pentane | 469.7 | 3.37 | Isopentane | 460.4 | 3.38 |
| Benzene | 562.05 | 4.895 | Cyclohexane | 553.8 | 4.08 |
| 1-hexene | 504.0 | 3.21 | Heptane | 540.2 | 2.74 |

273.2 K = 0° C.

The following abbreviations are used: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, TIBA is tri-isobutylaluminum, MAO is methylaluminoxane, pMe is para-methyl, flu is fluorenyl, cp is cyclopentadienyl.

By continuous is meant a system that operates (or is intended to operate) without interruption or cessation. For example, a continuous process to produce a polymer would be one where the reactants are continually introduced into one or more reactors and polymer product is continually withdrawn.

Slurry polymerization refers to a polymerization process in which particulate, solid polymer (e.g., granular) forms in a dense fluid or in a liquid/vapor polymerization medium. The dense fluid polymerization medium can form a single or two fluid phases, such as liquid, supercritical fluid, or liquid/liquid, or supercritical fluid/supercritical fluid, polymerization medium. In a liquid/vapor polymerization medium, the polymer resides in the liquid (dense) phase. Slurry polymerization processes typically employ heterogeneous catalyst particles, such as Ziegler-Natta catalysts or supported metallocene catalysts, and the like. The solid polymeric product typically adheres to the heterogeneous solid catalyst particles thus forming a slurry phase. Slurry polymerization processes operate below the solid-fluid phase transition temperature of the polymerization system.

Solution polymerization refers to a polymerization process in which the polymer is dissolved in a liquid polymerization system, such as an inert solvent or monomer(s) or their blends. Solution polymerization comprises a homogeneous liquid polymerization system in the reactor. The temperature of a liquid polymerization system is below of its supercritical or pseudo supercritical temperature, thus solution polymerizations are performed below the supercritical temperature and/or pressure. Conventional solution polymerization processes typically operate with more than 65 wt % inert solvent present in the polymerization system at pressures below 13 MPa (1885 psi) and temperatures between 40 and 160° C.

Advanced solution polymerization refers to a homogeneous solution polymerization process in which the reactor pressure is between 1.72-34.5 MPa (250-5,000 psi), the reactor temperature is between 50 and 160° C., solvent concentration in the liquid polymerization system is between 20 and 65 weight % (wt %). The solvent is typically a hydrocarbon or fluorohydrocarbon that is inert in polymerization. Advantageously, the solvent is a paraffinic hydrocarbon of 4-8 carbon atoms.

Supercritical polymerization refers to a polymerization process in which the polymerization system is in its dense supercritical or pseudo supercritical state, i.e. when the density of the polymerization system is above 300 g/L and its temperature and pressure are above the corresponding critical values.

Bulk polymerization refers to a polymerization process in which the dense fluid polymerization system contains less than 40 wt %, or less than 30 wt %, or less than 20 wt %, or less than 10 wt %, or less than 5 wt %, or less than 1 wt % of inert solvent. Inert solvents are characterized by their lack of incorporation into the product polymer chain. In the production of polyolefins, solvents are typically hydrocarbons comprising 4 to 20 carbon atoms, advantageously 5 to 10, or 5 to 8 carbon atoms. Note that the polymerization system may also contain inert diluents that do not incorporate into the product polymer chain. They are typically introduced as impurities present in the monomer feeds. For the purpose of the current disclosure, the inert diluents are considered separately from the inert solvents, the latter of which are added intentionally for their ability to keep the polymeric products in their dissolved state.

Homogeneous supercritical polymerization refers to a polymerization process in which the polymer is dissolved in a dense supercritical fluid polymerization medium, such as an inert solvent or monomer or their blends in their supercritical state. As described above, when the supercritical fluid polymerization system contains less than 40 wt %, or less than 30 wt %, or less than 20 wt %, or less than 10 wt %, or less than 5 wt %, or less than 1 wt % of inert solvent and the polymer is dissolved in the dense supercritical fluid, the process is referred to as a bulk homogeneous supercritical polymerization process. Homogeneous supercritical polymerization should be distinguished from heterogeneous supercritical polymerizations, such as for example, supercritical slurry processes, the latter of which are performed in supercritical fluids but form solid polymer particulates in the polymerization reactor. Similarly, bulk homogeneous supercritical polymerization should be distinguished from bulk solution polymerization, the latter of which is performed in a liquid as opposed to in a supercritical polymerization system.

Exemplary homogeneous polymerization processes are homogeneous supercritical (also referred to herein as supercritical), solution, or advanced solution polymerization processes.

DETAILED DESCRIPTION

All numerical values within the detailed description and the claims herein are modified by "about" or "approximately" the indicated value, and take into account experimental error and variations that would be expected by a person having ordinary skill in the art.

Provided are processes for feeding ethylene into a polymerization system operating in a liquid phase or supercritical phase. The processes for feeding ethylene into a polymerization system operating in a liquid phase or supercritical phase disclosed herein are distinguishable over the prior art in blending ethylene with a $C_3$-$C_{20}$ higher olefin and an optional inert solvent/diluent feed components at low pressures to produce an ethylene-carrying low-pressure blended feed stream followed by pressurizing the blended stream with a pump prior to feeding the blend to the polymerization reactor. In prior art processes for feeding ethylene into a polymerization system operating in a liquid phase or supercritical phase, the ethylene stream is not dissolved or blended with a $C_3$-$C_{20}$ higher olefin and an optional inert solvent/diluent before being pressurized to the reactor pressure, and hence the ethylene stream is fed as a high-pressure gas stream to the polymerization reactor.

The processes for feeding ethylene into a polymerization system operating in a liquid phase or supercritical phase of the present disclosure offer significant advantages relative to prior art processes because one or more compressors for pressurizing the gaseous ethylene stream and the associated capital and operating costs associated with such are eliminated. In addition, the processes for feeding ethylene into a polymerization system disclosed herein provide for more precise control of the ethylene feed rate to the reactor over a broader range of monomer input levels when the ethylene is fed as part of a blended liquid stream as opposed to a separate high-pressure gaseous stream.

The processes for feeding ethylene into a polymerization system disclosed herein may operate in conjunction with the advanced solution polymerization processes described in U.S. patent application Ser. No. 11/954,273 filed on Dec. 12, 2007, U.S. patent application Ser. No. 11/961,583 filed on Dec. 20, 2007, and U.S. patent application Ser. No. 12/016, 346 filed on Jan. 18, 2008, each of which are herein incorporated by reference in their entirety.

The processes for feeding ethylene into a polymerization system disclosed herein may also operate in conjunction with the solution polymerization processes and apparatus described in U.S. Pat. No. 7,163,989, herein incorporated by reference in its entirety.

The processes for feeding ethylene into a polymerization system disclosed herein may also operate in conjunction with the supercritical polymerization processes described in U.S. Pat. No. 7,279,536, herein incorporated by reference in its entirety.

The processes for feeding ethylene into a polymerization system operating in a liquid phase or supercritical phase disclosed herein may also operate in conjunction with the in-line blending processes described in U.S. Patent Application No. 60/876,193 filed on Dec. 20, 2006, herein incorporated by reference in its entirety.

The processes for feeding ethylene into a polymerization system operating in a liquid phase or supercritical phase disclosed herein may also operate in conjunction with the improved monomer recycle processes for fluid phase in-line blending of polymers described in U.S. Patent Application No. 60/905,247 filed on Mar. 6, 2007, herein incorporated by reference in its entirety.

Process Overview:

The processes for feeding ethylene into a polymerization system operating in a liquid phase or supercritical phase disclosed herein include a low-pressure ethylene and one or more low-pressure $C_3$ to $C_{20}$ monomer streams that are blended prior to being pressurized to the reactor pressure and subsequently fed to the reactor(s). The processes for feeding ethylene into a polymerization system disclosed herein may also optionally include inert solvent/diluents that are blended with the ethylene stream and the $C_3$ to $C_{20}$ monomer streams. Examples of inert solvents/diluents may include $C_1$ to $C_{20}$ saturated aliphatic and/or aromatic hydrocarbons and blends thereof. While some inert solvents/diluents may be introduced with the monomer feed as impurities, some other inert solvent/diluent components, including, but not limited to, butanes, pentanes, hexanes, n-hexane, iso-hexane, heptanes, octanes, petrol ether, toluene, and their blends may be intentionally added as process aids (for example, to keep the product polymer dissolved in the reactor, and/or to keep the viscosity of the polymerization system in the reactor and the in the effluent lines at manageable levels) or as carriers of other feed components, such as catalysts, and impurity scavengers (e.g., alkyl aluminum compounds).

The blending conditions for the ethylene, $C_3$ to $C_{20}$ higher olefin(s) and optional solvent/diluent streams are advantageously chosen to yield a liquid blend comprising the $C_3$ to $C_{20}$ higher olefin and the optional inert solvent/diluent components as a solvent and ethylene as a solute. Such conditions at a given temperature correspond to pressures equal to or above the bubble point of the ethylene-containing blend. Bubble point pressures and/or boiling points of hydrocarbon blends, comprising $C_1$ to $C_{20}$ aliphatic and aromatic hydrocarbons may be determined by standard techniques known in the art of chemical engineering. Methods suitable for conducting such calculations are equation of state methods, such as Peng Robinson or Suave Redlich Kwong. The ethylene may be directly delivered to the low-pressure blending point, or may be optionally compressed on site if the ethylene source (such as a cylinder or pipeline) pressure is not adequate. The $C_3$ to $C_{20}$ higher olefin and the optional inert solvent/diluent components may be delivered directly or their pressures may be boosted by one or more low-pressure feed pumps prior to being blended with the low-pressure ethylene stream.

The blending of the ethylene, $C_3$ to $C_{20}$ higher olefin and optional inert solvent/diluent (also referred to as blending components or feed components) may be performed in a batch or in a continuous mode. In a batch mode, the blending components may be metered into a blending tank gravimetrically or via flow meters. The blending tank may be optionally stirred to provide mixing of the tank contents. The use of a blending tank may be advantageous in buffering the fluctuations present in the process of delivering the blending components to a mixing point. Alternatively, the blending components may be mixed in the process pipes, a blending process that is referred to herein as in-line feed blending. In a continuous process, one advantage of in-line feed blending is that the blending tank, and its associated capital cost may be avoided. In the case where the blend components are brought together in the process pipes, blending may be improved through the use of one or more static mixers in the process piping downstream of the blending point of the blend components. When the blending of the feed components is performed in-line, the reactor feed blend may be fed to the polymerization reactor without buffer storage, or alternatively, the reactor feed blend may be fed to a buffer tank placed upstream of the reactor. In commercial operations, in-line blending without buffer storage is typically advantageous to reduce investment cost.

The ethylene-containing liquid feed blend may then be delivered to the reactor by one or more high-pressure liquid pumps that increase the pressure of the ethylene-carrying low-pressure feed blend to the reactor pressure. In order to avoid cavitation, the pressure of the reactor feed blend typically may be 2-5 atm (30-60 psi), or 2.4 to 3.8 atm (35 to 55 psi), or 2.8 to 3.4 atm (40 to 50 psi) above the bubble point at the suction side of the high-pressure pump to avoid cavitation and the loss of feed flow to the reactor. This pressure may be provided by delivering the blend components to the blending point at a pressure that exceeds the bubble point pressure by what is required for the stable pump operation (typically 2-5 atm/30-60 psi) plus the pressure drop between the low-pressure feed point and the high-pressure pump.

Alternatively, when the ethylene carrying low-pressure feed blend is stored in a buffer tank at or near their bubble point pressure, stable operations may be achieved by creating a temperature difference between the storage tank and the high-pressure pump. The temperature difference may be adjusted to elevate the bubble point pressure in the tank to exceed the vapor pressure at the pump suction point by that which is required for the stable pump operation (typically 2-5 atm/30-60 psi) plus the pressure drop between the low-pressure feed point and the high-pressure pump.

The blend of ethylene, $C_3$ to $C_{20}$ higher olefin and optional solvent/diluent may also be further diluted and blended with an ethylene-depleted recycled monomer stream prior to being fed to the reactor. The dilution with an ethylene-depleted recycled monomer stream may occur either before or after the high-pressure pump needed to bring the blend stream up to the reactor pressure. In the latter case, the ethylene-depleted low-pressure recycle stream is pressurized by a separate high-pressure pump, and the mixing with the ethylene-carrying high-pressure blended reactor feed can be performed either upstream of or in the reactor.

The processes for feeding ethylene into a polymerization system operating in a liquid phase or supercritical phase disclosed herein may be utilized with a variety of the reactor types, reactor configurations and reactor numbers even though the drawings which follow depict only single-stage and single-reactor operations for the sake of simplicity. For example, the disclosed processes for feeding ethylene into a polymerization system may be deployed in multi-stage series reactor cascades, and/or in parallel reactor banks of any configuration. In addition, the ethylene-carrying high-pressure blended reactor feed stream may be fed simultaneously to one or more reactors configured in parallel, in series, or a combination thereof. The one or more reactors configured in parallel, in series, or a combination thereof may include any combination of stirred tank, tubular, or loop reactors, wherein the ethylene-carrying high-pressure blended reactor feed stream may be pumped into a combination of any reactors, including the reactors downstream of the first reactor in the cascade. In a series reactor cascade, optionally the first reactor may operate ethylene-free, and an ethylene blend may be added to any one or more of the reactors downstream of the first, ethylene-free reactor. In such instances, the reactor cascade will produce a blend of ethylene-free polymers (for example, a propylene homopolymer, or an ethylene-free copolymer such as propylene-hexene-1 copolymer, etc.), and ethylene-containing polymers (for example, an ethylene-propylene, or ethylene-propylene-hexene-1 copolymer, etc.).

The processes for feeding ethylene into a polymerization system disclosed herein may include polymerization processes operating in a liquid phase or supercritical phase, which are catalyzed by single-site polymerization catalysts, such as Ziegler-Natta, metallocene, nonmetallocene metal-centered heteroaryl ligand catalysts, or late-transition metal catalysts. Advantageously, the disclosed ethylene co-feeding methods are deployed in polymerization processes, particularly in high-pressure polymerization processes, such as for example, conventional solution polymerization, advanced solution polymerization, and bulk homogeneous polymerization processes, such as bulk homogeneous supercritical or bulk solution polymerization processes as defined above.

Ethylene Co-Feeding Process Embodiments:

One embodiment of the processes for feeding ethylene into a polymerization system operating in a liquid phase or supercritical phase disclosed herein includes providing a low-pressure ethylene stream, one or more low-pressure $C_3$ to $C_{20}$ monomer streams, an optional low-pressure inert solvent/diluent stream, and one or more reactors configured in parallel, in series, or a combination thereof; metering the low-pressure ethylene stream, the one or more low-pressure $C_3$ to $C_{20}$ monomer streams, and the optional low-pressure inert solvent/diluent stream; blending the metered low-pressure ethylene stream, the metered one or more low-pressure $C_3$ to $C_{20}$ monomer streams, and the metered low-pressure optional inert solvent/diluent stream to form an ethylene-carrying low-pressure blended liquid feed stream; pressurizing the ethylene-carrying low-pressure blended liquid feed stream to the polymerization system pressure with one or more high-pressure pumps to form an ethylene-carrying high-pressure blended reactor feed stream; and feeding the ethylene-carrying high-pressure blended reactor feed stream to the one or more reactors configured in parallel, in series, or a combination thereof. A non-limiting exemplary process schematic 200 for this embodiment is depicted in FIG. 2.

Figure 2:
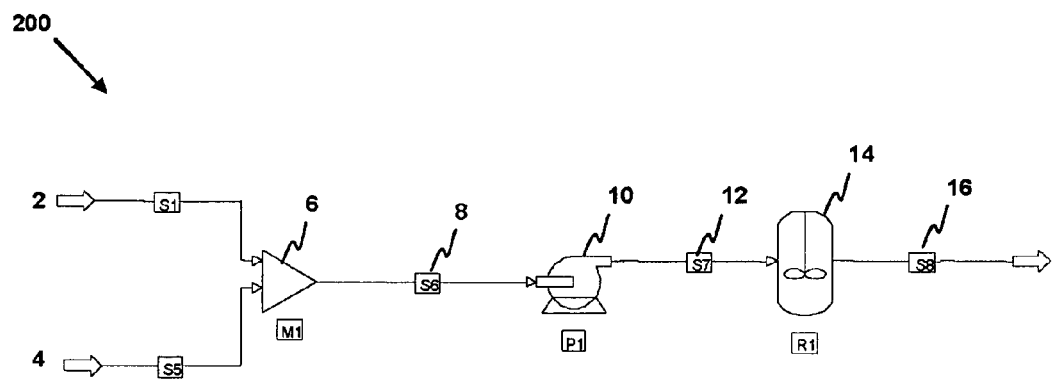
FIG. 2 depicts a process schematic of one embodiment disclosed herein for feeding ethylene monomer to a polymerization reactor operating in a liquid phase or supercritical phase.

Referring to FIG. 2, a low-pressure ethylene feed stream 2 is combined with a low pressure $C_3$ to $C_{20}$ monomer stream 4 at a blending point 6 to form an ethylene-carrying low-pressure blended liquid feed stream 8. The blending point 6 depicted may be a pipe, or a blending tank (not shown). The pipe may have one or more optional static mixers to bring the ethylene-carrying low-pressure blended liquid feed stream 8 into a turbulent flow regime (Reynolds number >3500) for enhanced blending. The ethylene-carrying low-pressure blended liquid feed stream 8 is then pressurized with a high-pressure pump 10 to the polymerization system pressure to form an ethylene-carrying high-pressure blended reactor feed stream 12. The ethylene-carrying high-pressure blended reactor feed stream 12 is then fed to a polymerization reactor 14 (depicted as a stirred tank, but could be tubular, loop, etc.) that is operating in either a liquid phase or a supercritical phase. Exemplary liquid phase polymerization processes include solution polymerization and advanced solution processes as defined above. The copolymer containing reactor effluent stream 16 then emerges from the stirred tank reactor 14 for further downstream processing.

Figure 3:
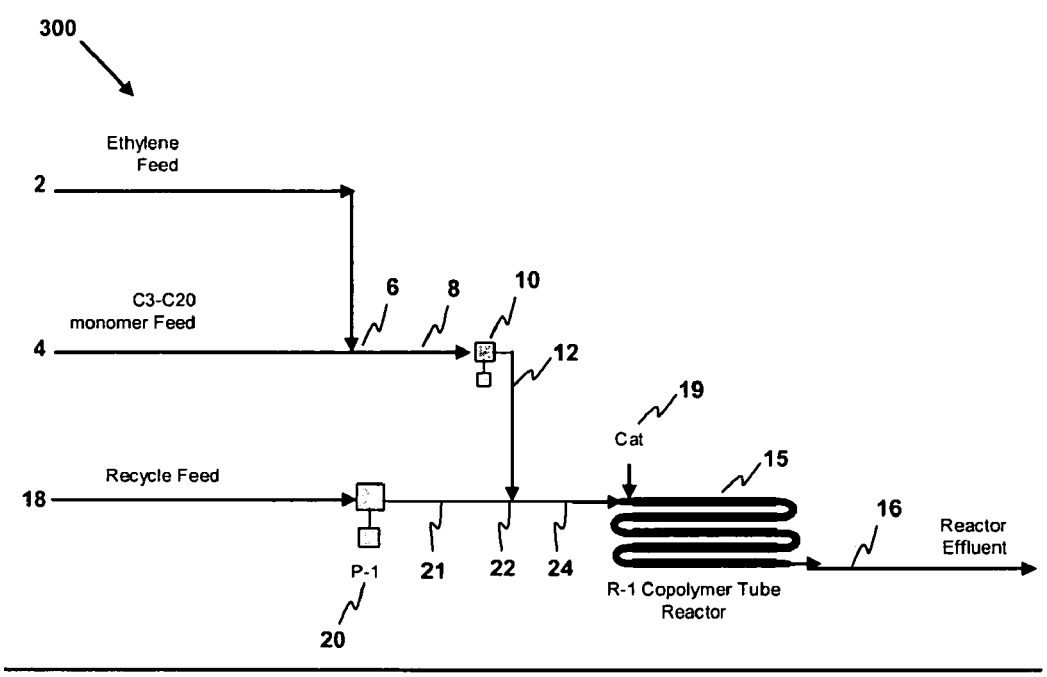
FIG. 3 depicts a process schematic of another embodiment disclosed herein for feeding ethylene monomer to a polymerization reactor operating in a liquid phase or supercritical phase, wherein the ethylene feed stream is combined with the recycle feed stream after the high-pressure pump.

FIG. 3 is an alternative exemplary process schematic 300 for the processes for feeding ethylene into a polymerization system operating in a liquid phase or supercritical phase disclosed herein. In this case, the reactor feed streams include an ethylene-depleted recycle stream, which is pressurized separately to the reactor pressure to form an ethylene-depleted high-pressure recycle feed stream. The ethylene-carrying high-pressure reactor feed stream is blended with the ethylene-depleted high-pressure recycle feed stream. Referring to FIG. 3, a low-pressure ethylene feed stream 2 is combined with a low-pressure $C_3$ to $C_{20}$ monomer stream 4 at a blending point 6 to form an ethylene-carrying low-pressure blended liquid feed stream 8. The blending point 6 depicted may be a pipe, or a blending tank (not shown). The pipe may have one or more optional static mixers to bring the ethylene-carrying low-pressure blended liquid feed stream 8 into a turbulent flow regime (Reynolds number >3500) for enhanced blending. The ethylene-carrying low-pressure blended liquid feed stream 8 is then pressurized with a high-pressure pump 10 to the polymerization system pressure to form an ethylene-carrying high-pressure blended reactor feed stream 12. A low-pressure monomer recycle feed stream 18 from the tubular reactor 15 is metered and pressurized with a high-pressure pump 20 to the polymerization system pressure to form a high-pressure monomer recycle feed stream 21. The high-pressure monomer recycle feed stream 21 is then blended with the ethylene-carrying high-pressure blended reactor feed stream 12 at a blending point 22. The blending point 22 may be a pipe, or a blending tank (not shown), and the pipe may have one or more optional static mixers to bring the recycle and ethylene-carrying high-pressure blended liquid feed stream 24 into a turbulent flow regime (Reynolds number >3500) for enhanced blending. The recycle and ethylene-carrying high-pressure blended liquid feed stream 24 along with a suitable catalyst system 19 are fed to the tubular reactor 15 that is operating in either a liquid phase (solution or advanced solution) or a supercritical phase. The copolymer containing reactor effluent stream 16 emerges from the tubular reactor 15 for further downstream processing. In an alternative form not shown in FIG. 3, the high-pressure recycle feed stream 21 may be fed directly to the tubular reactor 15 as opposed to first being combined with the ethylene-carrying high-pressure blended reactor feed stream 12.

Figure 4:
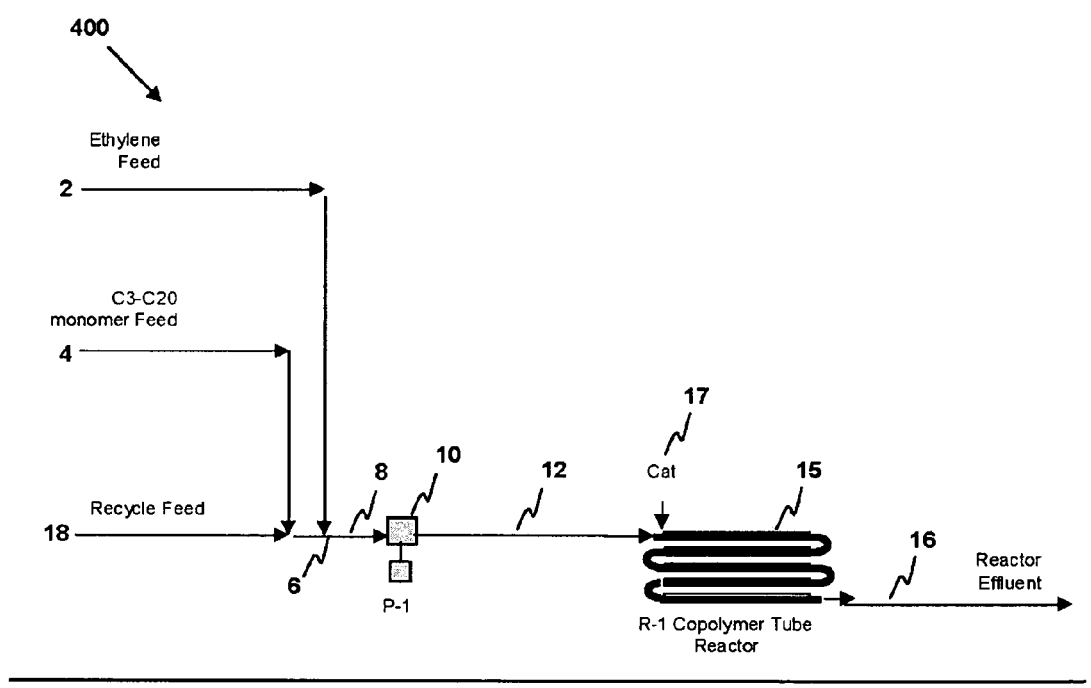
FIG. 4 depicts a process schematic of yet another embodiment disclosed herein for feeding ethylene monomer to a polymerization reactor operating in a liquid phase or supercritical phase, wherein the ethylene feed stream is combined with the recycle feed stream before the high-pressure pump.

FIG. 4 shows yet another alternative exemplary process configuration 400 for the processes for feeding ethylene into a polymerization system operating in a liquid phase or supercritical phase disclosed herein. In this case, the ethylene feed stream and the $C_3$ to $C_{20}$ higher olefin stream are blended with a recycle feed stream at low pressure prior to being pressurized to the reactor pressure. Referring to FIG. 4, a low-pressure ethylene feed stream 2, a low-pressure $C_3$ to $C_{20}$ monomer stream 4, and a low-pressure recycle feed stream 18 from the tubular reactor 15 are combined at a blending point 6 to form an ethylene-carrying low-pressure blended liquid feed stream 8. The blending point 6 depicted may be a pipe, or a blending tank (not shown). The pipe may have one or more optional static mixers to bring the ethylene-carrying low-pressure blended liquid feed stream 8 into a turbulent flow regime (Reynolds number >3500) for enhanced blending. The ethylene-carrying low-pressure blended liquid feed stream 8 is then pressurized with a high-pressure pump 10 to the polymerization system pressure to form an ethylene-carrying high-pressure blended reactor feed stream 12. The ethylene-carrying high-pressure blended liquid feed stream 12 along with a suitable catalyst system 19 are then fed to the tubular reactor 15 that is operating in either a liquid phase (conventional solution or advanced solution) or a supercritical phase. The copolymer containing reactor effluent stream 16 emerges from the tubular reactor 15 for further downstream processing.

The processes disclosed herein and depicted in FIGS. 2-4 may include one or more low-pressure $C_3$ to $C_{20}$ monomer streams such as to produce an ethylene containing monomer. The one or more $C_3$ to $C_{20}$ monomer streams may be chosen from propylene, butenes, butene-1, butene-2, isobutylene, pentene-1, hexene-1, heptene-1, octene-1, decene-1, styrene, o-methylstyrene, p-methylstyrene, 1,3-butadiene, 1,5-hexadiene, 1,7-octadiene, 1,9-decadiene, divinylbenzene, dicyclopentadiene, norbornene, norbornadiene, vinylnorbornene, ethylidenenorbornene, and combinations thereof. One advantageous $C_3$ to $C_{20}$ monomer stream is propylene such that the reactor product may be an ethylene-propylene copolymer. The ethylene-propylene copolymer may be a random copolymer, or a block type copolymer or a polymer blend comprising ethylene-propylene copolymer.

Alternatively, the processes depicted in FIGS. 2-4 and disclosed herein may include one or more optional inert solvent/diluent streams that may be combined at low pressure with the ethylene feed stream and the $C_3$ to $C_{20}$ monomer stream. Non-limiting exemplary optional inert solvent/diluent stream may be chosen from $C_4$ to $C_{20}$ saturated aliphatic hydrocarbons, aromatic hydrocarbons and combinations thereof. Non-limiting exemplary $C_4$ to $C_{20}$ saturated aliphatic hydrocarbons for the one or more optional inert solvent/diluent streams may be chosen from petrol ether, butanes, pentanes, hexanes, heptanes, octanes, cyclohexane, and combinations thereof. An advantageous aromatic hydrocarbon for use as an optional inert solvent/diluent stream is toluene.

The processes disclosed herein and depicted in FIGS. 2-4 include one or more low-pressure ethylene feed streams. The ethylene feed stream is generally of a purity of greater than 98.0, or 99.0, or 99.5, or 99.9%. The ethylene may be directly delivered to the low-pressure blending point, or may be optionally compressed on site if the ethylene source (such as a cylinder or pipeline) pressure is not adequate. For example, an optional stage 1 compressor or booster may be used to increase the pressure of the ethylene for delivery to the low-pressure blending point.

The low-pressure ethylene feed stream depicted in FIGS. 2, 3 and 4 may be metered to the low-pressure blending point with one or more mass flow controllers. The one or more low-pressure $C_3$ to $C_{20}$ monomer streams, and the optional low-pressure inert solvent/diluent stream may be metered to the blending point using one or more mass flow controllers, one or more metering pumps, or a combination thereof. "Low-pressure" as it refers to herein to the ethylene stream, one or more low-pressure $C_3$ to $C_{20}$ monomer streams, and the one or more optional inert solvent/diluent stream refers to a pressure advantageously ranging from 5-100, or 5-50, or 5-25, or 10-100, or 10-50, or 10-25 times lower than the reactor pressure, and advantageously in the range of 2 to 400, or 10 to 350, or 20 to 300, or 50 to 250, or 100 to 200 atmospheres. The metered low-pressure ethylene feed stream comprises from 0.1 to 70 wt % of the ethylene-carrying low-pressure blended liquid feed stream. After blending with the $C_3$ to $C_{20}$ monomer stream and the optional inert solvent/diluent stream, the ethylene-carrying blended liquid feed stream may include from 0.1 to 70, or 0.5 to 50, or 1 to 50, or 1 to 40, or 1 to 30, or 1 to 20 wt % ethylene.

The pressure of the ethylene-carrying low-pressure blended liquid feed stream should be greater than or equal to its bubble point pressure measured at the pressure of the ethylene-carrying low-pressure blended liquid feed stream to avoid cavitation at the high-pressure pump inlet. More particularly, the pressure of the ethylene-carrying low-pressure blended liquid feed stream may be at least 1, 3, 5, 10, or 15 atmospheres greater than its bubble point pressure. The temperature of the ethylene-carrying low-pressure blended liquid feed stream should be less than or equal to its boiling point temperature (measured at the pressure of the high-pressure pump inlet) to avoid cavitation at the high-pressure pump inlet. More particularly, the temperature of the ethylene-carrying low-pressure blended liquid feed stream may be at least 5, 10, 15, 20 or 25° C. less than its boiling point temperature at the pressure of the high-pressure pump inlet.

The blending point in the processes disclosed herein for combining the low-pressure ethylene stream, the one or more low-pressure $C_3$ to $C_{20}$ monomer streams, and the optional low-pressure inert solvent/diluent stream may be chosen from process piping, a blending tank (stirred or unstirred), a heat exchanger, or combinations thereof. Where a blending tank is used to combine the blend streams, the tank may include a means for cooling, such as of example, cooling coils coupled to a heat exchanger. When process piping is used to combine the blend streams, at the blend point and/or downstream of the blend point, there may be included one or more static mixers in the process piping. As previously mentioned, the static mixers may improve the mixing between the blend components by moving the blend into the turbulent flow regime (Reynolds number >3500) for enhanced blending.

After the low-pressure ethylene stream, the one or more low-pressure $C_3$ to $C_{20}$ monomer streams, and the one or more optional low-pressure inert solvent/diluent streams are blended to form a low-pressure ethylene-carrying blended reactor liquid feed stream, the blend passes through one or more high-pressure pumps to form a high-pressure ethylene-carrying blended reactor liquid feed stream. The pressure of the ethylene-carrying high-pressure blended reactor feed stream advantageously ranges from 5-100, or 5 to 50, or 5-25, or 5-10, or 10 to 100, or 10 to 50, or 10 to 25 times higher than the pressure of the ethylene-carrying low-pressure blended liquid feed stream and is advantageously in the range of 50 to 2000, or 50 to 1000, or 50 to 500, or 50 to 300, or 50 to 200, or 100 to 1000 atm.

The ethylene-carrying high-pressure blended reactor liquid feed stream may then be fed directly to the one or more reactors configured in parallel, in series, or a combination. Alternatively, the ethylene-carrying high-pressure blended reactor liquid feed stream may be stored in a buffer tank prior to feeding to the one or more reactors configured in parallel, in series, or a combination thereof. The buffer tank may include a cooling means, such as for example, cooling coils and a heat exchanger to maintain a constant controlled temperature. The buffer tank may also optionally include a stirrer to maintain agitation of the ethylene-carrying high-pressure blended reactor liquid feed stream.

As previously described, the processes for feeding ethylene into a polymerization system operating in a liquid phase or supercritical phase disclosed herein may also include a monomer recycle stream from the reactor. The monomer recycle stream may be at low pressure. It may be combined with the ethylene, $C_3$ to $C_{20}$ monomer, and optional inert solvent/diluent at low pressure or may be separately pressurized and fed to the reactor independent of the ethylene-carrying blended liquid feed stream. If the recycle stream is fed separately, it may be metered with one or more mass flow controllers, one or more metering pumps, or a combinations thereof, and subsequently pressurized to the reactor pressure using one or more high pressure pumps prior to feeding it to the one or more reactors configured in parallel, in series or a combination thereof. Still alternatively, the metered high-pressure recycle stream may be blended with the high-pressure ethylene-carrying blended liquid feed stream prior to the reactor to form a high-pressure recycle and ethylene-carrying high-pressure blended liquid feed stream for feeding to the one or more reactors configured in parallel, in series or a combination thereof.

The processes for feeding ethylene into a polymerization system operating in a liquid phase or supercritical phase disclosed herein may include one or more reactors configured in parallel, in series, or a combination thereof, wherein the reactors are chosen from tubular, stirred tank, loop, and combinations thereof. For series reactors, the number of reactors may be two, three, four or five. For parallel reactors, the number of parallel trains may be two, three, four or five. For a combination of parallel and series reactors, the number or series reactors may range from 2 to 5 and the number or parallel reactor trains may range from 2 to 5. The one or more reactors configured in parallel, in series, or a combination thereof may operate at pressures ranging from 50 to 2000, or 50 to 1000, or 50 to 500, or 50 to 300, or 50 to 200, or 100 to 1000 atm. The one or more reactors configured in parallel, in series, or a combination thereof operate within process regimes chosen from conventional solution, advanced solution, supercritical and combinations thereof.

The processes for feeding ethylene into a polymerization system operating in a liquid phase or supercritical phase disclosed herein may further include feeding one or more catalyst feed streams comprising one or more catalyst systems to the one or more reactors configured in parallel, in series, or a combination thereof described above. The catalyst systems in the one or more catalyst feed streams may include one or more catalysts, one or more activators, and one or more catalyst supports. Non-limiting exemplary catalysts may include Ziegler-Natta catalysts, metallocene catalysts, non-metallocene metal-centered, heteroaryl ligand catalysts, and late transition metal catalysts. Non-limiting exemplary activators may include aluminoxane activators, aluminum alkyl activators, ionizing activators, non-ionizing activators, non-coordinating anion (e.g., borate) activators, and combinations thereof. Non-limiting exemplary catalyst supports include talcs, inorganic oxides, and inorganic chlorides, polystyrene, polystyrene divinyl benzene polyolefins, zeolites, clays, inorganic oxides, silica, fumed silica, alumina, silica-alumina, magnesia, titania, zirconia, magnesium chloride, montmorillonite phyllosilicate, porous acrylic polymers, nanocomposites, spherulites, polymeric beads and combinations thereof.

The remainder of the detailed description sets forth the details of the polymerization process operating in a liquid phase (solution or advanced solution) or supercritical phase where the processes for feeding ethylene disclosed herein are advantageous. The advantageous processes for feeding ethylene disclosed herein include at least one reactor that operates within a homogeneous dense fluid phase (solution, advanced solution or supercritical phases). Polymerization processes that operate in a homogenous dense fluid phase use either inert solvent(s) or monomer(s) or their mixtures as a solvent/diluent in their liquid or supercritical state. Hence, the one or more reactors disclosed herein operate with polymerization systems in their homogeneous supercritical or in their liquid state. In both the supercritical and solution polymerization reactors, the process may be a bulk polymerization process operating with less than 40%, or less than 30%, or less than 20 wt % or less than 10 wt % or less than 5 wt % of inert solvent present in the reactor, and in some embodiments, with bulk monomers essentially free (less than 1 wt %) of inert solvents. In one embodiment of the disclosed ethylene feed processes, the reactors operate at bulk homogeneous supercritical conditions as has been disclosed in U.S. Patent Publication Nos. 2006-0211832 and 2006-0025545, herein incorporated by reference in their entirety.

In another embodiment, the one or more reactors operate at conditions where the polymer dissolution is substantially aided by an inert solvent (solution process where the polymerization medium contains more than 40 wt % solvent, typically more than 60 wt % solvent) as has been disclosed in PCT Publication No. WO 2006/044149, herein incorporated by reference in its entirety. This range of solvent concentrations generally corresponds to a monomer concentration in the reactor up to 2.0 mol/L. In yet another embodiment, one or more of the reactors operate in the homogeneous supercritical state and one or more of the reactors included in the series or parallel bank of reactors operate in the solution state (combination of solution process and homogeneous supercritical process reactors). Both solution and homogeneous supercritical polymerization processes operate a sufficiently high pressures where the ethylene feed methods disclosed herein are advantageous. Both solution and homogeneous supercritical polymerization processes providing polymers in a homogeneous fluid state may be performed in a bulk monomer phase using essentially pure monomer(s) as solvent or may keep the polymer in the homogeneous fluid state by employing an inert solvent in substantial concentrations (i.e., 40 wt % or more). The solution process provides for a polymer-containing liquid phase either in an inert solvent or in the essentially neat monomer or in their mixture in their liquid state. The homogeneous supercritical process provides for the polymeric fluid state by dissolving the polymeric product either in an inert solvent or in the essentially neat monomer or in their mixture in their supercritical state.

In another embodiment, the improved ethylene feed processes disclosed herein may be incorporated into one or more of the reactors associated with the improved in-line process for blending polymers to improve blend quality and reduce the capital and operating costs associated with a combined polymerization and blending plant disclosed in U.S. patent application Ser. No. 12/002,509, and U.S. patent application Ser. No. 12/074,496 herein incorporated by reference in their entirety.

Homogeneous Polymerization Process Details

In one or more embodiments, the process includes contacting, in a polymerization system, ethylene monomer and one or more $C_3$ to $C_{20}$ monomers (advantageously propylene) with a catalyst, an activator, and optionally inert diluent or solvent, at a temperature above 40° C., or above 50° C., or above 60° C., or above 70° C., or above 80° C. and at a pressure above 10 atm, or above 50 atm, or above 100 atm, or above 130 atm, or above 280 atm. The polymerization takes place in a homogeneous polymerization system within the reactor. Other $C_3$ to $C_{20}$ monomers may include butene-1, hexene-1, octene-1, or decene-1 and combinations thereof.

In one or more embodiments, the density of the polymerization system is about 0.3 g/mL or more. In one or more embodiments, the density of the polymerization system is about 0.4 g/mL or more. In one or more embodiments, the density of the polymerization system is about 0.5 g/mL or more. In one or more embodiments, the density of the polymerization system is about 0.6 g/mL or more. In one or more embodiments, the density of the polymerization system is of from 0.3 g/mL to 0.75 g/mL or from 0.35 to 0.70 g/mL.

In one or more embodiments, the steady state polymer yield (i.e., conversion of monomer to polymer product) per pass is at least 5 wt % of the monomer. In one or more embodiments, the conversion of monomer to polymer product in a single pass is at least 10 wt % of the monomer. In one or more embodiments, the conversion of monomer to polymer product in a single pass is at least 20 wt % of the monomer. In one or more embodiments, the conversion of monomer to polymer product in a single pass is at least 30 wt % of the monomer. In one or more embodiments, the conversion of monomer to polymer product in a single pass is at least 40 wt % of the monomer. In one or more embodiments, the conversion of monomer to polymer product in a single pass is at least 50 wt % of the monomer. In one or more embodiments, the conversion of monomer to polymer product in a single pass is at least 60 wt % of the monomer. In one or more embodiments, the conversion of monomer to polymer product in a single pass is at least 70 wt % of the monomer. In one or more embodiments, the conversion of monomer to polymer product in a single pass is at least 80 wt % of the monomer. In one or more embodiments, the conversion of monomer to polymer product in a single pass is at least 90 wt % of the monomer.

In one or more embodiments, the polymerization conditions are sufficient to dissolve the polymer product in the monomer(s) present in the liquid state (i.e. "bulk solution polymerization"). In one or more embodiments, the polymerization conditions are sufficient to dissolve the polymer product in the monomer(s) present in the supercritical state (i.e. "bulk supercritical polymerization"). In one or more embodiments, the critical temperature and pressure of reactor blends are different from the critical values of pure components, and thus supercritical operations at temperatures lower than the critical temperature of one or more of the pure monomers (e.g., 92° C. for propylene) are possible. In one or more embodiments, near-amorphous materials with low melting points as well as amorphous materials can be produced even below the critical temperature of the reactor blends, i.e., at temperatures that correspond to the condensed liquid state of the polymerization system in the reactor. In these instances, the operating temperature can be below the boiling point of the reaction mixture and thus the reactor can operate at what is often referred to as liquid-filled conditions. In some instances, such operation mode could be desired to achieve high molecular weight (MW) and thus low melt flow rate (MFR), particularly in the manufacture of copolymers, such as propylene-ethylene or ethylene-higher olefin copolymers.

In one or more embodiments, the reaction temperature and pressure can be selected so that the polymerization system remains at a pressure below the polymer's cloud point in the particular polymerization system, resulting in a two-phase polymerization system: a polymer rich phase and a polymer lean phase. Some embodiments that are below the polymer's cloud point nonetheless operate above the polymer's crystallization temperature. The terms "two-phase system" or "two-phase polymerization system" refer to a polymerization system having two and, advantageously, only two phases. In certain embodiments, the two phases are referenced as a "first phase" and a "second phase." In certain embodiments, the first phase is or includes a "monomer phase," which includes monomer(s) and can also include diluent and some or all the product of polymerization. In certain embodiments, the second phase is or includes a solid phase, which can include products of polymerization, e.g., macromers and polymer product, but not monomers, e.g., propylene.

In one or more embodiments, the polymerization temperature is above the cloud point of the single-phase polymerization system at the reactor pressure. More advantageously, the temperature is 2° C. or more above the cloud point of the polymerization system at the reactor pressure. In another embodiment, the temperature is between 40 and 250° C., between 50 and 200° C., between 60 and 180° C., or between 70 and 150° C. In another embodiment, the temperature is above 40, 50, 60, 70, 80, 90, 95, 100, 110, or 120° C. In another embodiment, the temperature is below 250, 200, 190, 180, 170, 160, or 150° C. In one or more embodiments, the polymerization temperature is from about 40° C. to about 190° C. In one or more embodiments, the polymerization temperature is about 40° C. to about 160° C. In one or more embodiments, the polymerization temperature is about 40° C. to about 140° C. In one or more embodiments, the polymerization temperature is about 40° C. to about 130° C. In one or more embodiments, the polymerization temperature is about 40° C. to about 105° C. In one or more embodiments, the polymerization temperature is about 40° C. to about 95° C. In one or more embodiments, the polymerization temperature is about 40° C. to about 65° C.

In one or more embodiments, the polymerization temperature is above the solid-fluid phase transition temperature of the polymerization system at the reactor pressure. Advantageously, the temperature is at least 2° C. or at least 5° C. above the solid-fluid phase transition temperature of the polymerization system at the reactor pressure. More advantageously, the temperature is at least 10° C. above the solid-fluid phase transformation point of the polymerization system at the reactor pressure.

In one or more embodiments, the polymerization pressure is no lower than the fluid-fluid phase transition pressure of the polymerization system at the reactor temperature. In one or more embodiments, the polymerization pressure is no lower than 100 atm below, or no lower than 50 atm below, or no lower than 20 atm below, or no lower than 10 atm below, or no lower than 1 atm below, or no lower than 0.1 atm below the cloud point of the polymerization system at the reactor temperature. In one or more embodiments, the pressure is between 10 atm and 3000 atm, between 138 atm and 2000 atm, or between 200 and 1500 atm, or between 50 and 1000 atm. In one or more embodiments, the pressure is above 10, 50, 100, 150, 200, 300, or 400 atm. In one or more embodiments, the pressure is below 5000, 3000, 2500, 2000, 1000, or 500 atm. In one or more embodiments, the pressure is between 10 and 2000 atm, between 10 and 1000 atm, or between 10 and 500 atm, or between 10 and 400 atm, or between 10 and 300 atm, or between 10 and 200 atm, or between 10 and 150 atm, or between 10 and 140 atm, or between 10 and 103 atm, or between 10 and 120 atm, or between 10 and 110 atm. In one or more embodiments, the pressure is about 130 atm or more. In one or more embodiments, the pressure is about 130 atm to about 420 atm. In one or more embodiments, the pressure is about 130 atm to about 350 atm. In one or more embodiments, the pressure is about 130 atm to about 280 atm. In one or more embodiments, the pressure is about 10 atm to about 200 atm.

Monomers

In addition to ethylene monomer, any other C3 to C20 monomer having one or more (non-conjugated) aliphatic double bond(s) can be used. Examples for advantageous C3 to C20 monomers include propylene, butenes, butene-1, butene-2, isobutylene, pentene-1, hexene-1, heptene-1, octene-1, decene-1, styrene, o-methylstyrene, p-methylstyrene, 1,3-butadiene, 1,5-hexadiene, 1,7-octadiene, 1,9-decadiene, divinylbenzene, dicyclopentadiene, norbornene, norbornadiene, vinylnorbornene, ethylidenenorbornene, and the like.

In one or more embodiments, unsaturated monomer or monomers can be used. Monomers include $C_3$ to $C_{20}$ olefins, advantageously $C_3$ to $C_{12}$ olefins and more advantageously $C_3$ to $C_8$ olefins. In some embodiments advantageous monomers include linear, branched or cyclic alpha-olefins of $C_3$ to $C_{20}$ alpha-olefins, and advantageously $C_3$ to $C_{12}$ alpha-olefins. Advantageous $C_3$ to $C_{20}$ olefin monomers can be one or more of propylene, butenes, butene-1, butene-2, isobutylene, pentene-1, hexene-1, heptene-1, octene-1, decene-1, styrene, o-methylstyrene, p-methylstyrene, 1,3-butadiene, 1,5-hexadiene, 1,7-octadiene, 1,9-decadiene, divinylbenzene, dicyclopentadiene, norbornene, norbornadiene, vinylnorbornene, ethylidenenorbornene.

Catalyst Systems

Any polymerization catalyst capable of polymerizing the monomers disclosed can be used if the catalyst is sufficiently active under the polymerization conditions disclosed herein. Thus, Group 3-10 transition metals can form suitable polymerization catalysts. A suitable olefin polymerization catalyst will be able to coordinate to, or otherwise associate with, an alkenyl unsaturation. Illustrative, but not limiting, olefin polymerization catalysts include Ziegler-Natta catalyst compounds, metallocene catalyst compounds, late transition metal catalyst compounds, nonmetallocene metal-centered heteroaryl ligand catalysts, and other non-metallocene catalyst compounds.

As disclosed herein, Ziegler-Natta catalysts are those referred to as first, second, third, fourth, and fifth generation catalysts in the PROPYLENE HANDBOOK, E. P. Moore, Jr., Ed., Hanser, N.Y., 1996. Metallocene catalysts in the same reference are described as sixth generation catalysts. One exemplary non-metallocene catalyst compound comprises non-metallocene metal-centered, heteroaryl ligand catalyst compounds (where the metal is chosen from the Group 4, 5, 6, the lanthanide series, or the actinide series of the Periodic Table of the Elements).

Just as in the case of metallocene catalysts, these nonmetallocene metal-centered, heteroaryl ligand catalyst compounds are typically made fresh by mixing a catalyst precursor compound with one or more activators. Nonmetallocene metal-centered, heteroaryl ligand catalyst compounds are described in detail in PCT Patent Publications Nos. WO 02/38628, WO 03/040095 (pages 21 to 51), WO 03/040201 (pages 31 to 65), WO 03/040233 (pages 23 to 52), WO 03/040442 (pages 21 to 54), WO 2006/38628, and U.S. patent application Ser. No. 11/714,546, each of which is herein incorporated by reference.

Particularly useful metallocene catalyst and non-metallocene catalyst compounds are those disclosed in paragraphs [0081] to [0111] of U.S. Ser. No. 10/667,585 and paragraphs [0173] to [0293] of U.S. Ser. No. 11/177,004, the paragraphs of which are herein incorporated by reference.

The processes disclosed can employ mixtures of catalyst compounds to select the properties that are desired from the polymer. Mixed catalyst systems can be employed in the in-line blending processes to alter or select desired physical or molecular properties. For example, mixed catalyst systems can control the molecular weight distribution of isotactic polypropylene when used with the disclosure processes or for the disclosure polymers. In one embodiment of the processes disclosed herein, the polymerization reaction(s) can be conducted with two or more catalyst compounds at the same time or in series. In particular, two different catalyst compounds can be activated with the same or different activators and introduced into the polymerization system at the same or different times. These systems can also, optionally, be used with diene incorporation to facilitate long chain branching using mixed catalyst systems and high levels of vinyl terminated polymers.

The process of the present disclosure can use one or more catalysts in any of the reactors of the polymerization reactor section. Any number of catalysts can be deployed in any of the reactors of the polymerization reactor section of the present disclosure. For practical reasons, no more than five catalysts are advantageous and no more than three catalysts are more advantageous in any given reactor. The process of the present disclosure can use the same or different catalysts or catalyst mixtures in the different individual reactors of the reactor section of the present disclosure. For practical reasons, the deployment of no more than ten catalysts is advantageous and the deployment of no more than six catalysts is more advantageous in the polymerization process of the present disclosure.

The one or more catalysts deployed in the process of the present disclosure can be homogeneously dissolved in the polymerization system or can form a heterogeneous solid phase in the reactor. Operations with homogeneously dissolved catalysts are advantageous. When the catalyst is present as a solid phase in the polymerization reactor, it can be supported or unsupported. The process of the present disclosure can use any combination of homogeneous and heterogeneous catalysts simultaneously present in one or more of the individual reactors of the polymerization reactor section, i.e., any reactor of the polymerization section of the present disclosure can contain one or more homogeneous catalysts and one or more heterogeneous catalysts simultaneously.

The process of the present disclosure can use any combination of homogeneous and heterogeneous catalysts deployed in the polymerization reactor section of the present disclosure. These combinations comprise scenarios when some or all reactors use a single catalyst and scenarios when some or all reactors use more than one catalyst. One or more catalysts deployed in the process of the present disclosure can be supported on particles using fumed silica as support, which either can be dispersed in the fluid polymerization system or can be contained in a stationary catalyst bed.

When the supported catalyst particles are dispersed in the polymerization system, they can be left in the polymeric product or can be separated from the product prior to its crystallization from the fluid reactor effluent in a separation step that is downstream of the polymerization reactor section. If the catalyst particles are recovered, they either can be discarded or can be recycled with or without regeneration. The catalyst can also be supported on structured supports, such as monoliths comprising straight or tortuous channels, reactor walls, internal tubing, etc. These structured supports are well known in the art of heterogeneous catalysis.

When the catalyst(s) is (are) supported, operation with dispersed or otherwise defined particles is advantageous. When the catalyst is supported on dispersed particles, operations without catalyst recovery are advantageous, i.e., the catalyst is left in the polymeric product of the process of the present disclosure. Unsupported catalysts dissolved in the polymerization system are most advantageous. The catalyst(s) can be introduced any number of ways to the reactor. For example, the catalyst(s) can be introduced with the monomer-containing feed or separately.

In addition, the catalyst(s) can be introduced through one or multiple ports to the reactor. If multiple ports are used for introducing the catalyst(s), those ports can be placed at essentially the same or at different positions along the length of the reactor. If multiple ports are used for introducing the catalyst(s), the composition and the amount of catalyst feed through the individual ports can be the same or different. Adjustment in the amounts and types of catalyst through the different ports enables the modulation of polymer properties, such as molecular weight distribution, composition, composition distribution, crystallinity, etc.

Activators and Activation Methods for Catalyst Compounds:

The catalyst compounds described herein are combined with activators for use herein. An activator is defined as any combination of reagents that increases the rate at which a metal complex polymerizes unsaturated monomers, such as olefins. An activator can also affect the molecular weight, degree of branching, monomer content, or other properties of the polymer.

A. Aluminoxane and Aluminum Alkyl Activators:

In one form, one or more aluminoxanes are utilized as an activator in the in-line blending processes disclosed herein. Aluminoxanes, sometimes called alumoxanes in the art, are generally oligomeric compounds containing —Al(R)—O— subunits, where R is an alkyl group. Examples of aluminoxanes include methylaluminoxane (MAO), modified methylaluminoxane (MMAO), ethylaluminoxane and isobutylaluminoxane. Alkylaluminoxanes and modified alkylaluminoxanes are suitable as catalyst activators, particularly when the abstractable ligand is a halide. Mixtures of different aluminoxanes and modified aluminoxanes can also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180.

When the activator is an aluminoxane (modified or unmodified), some embodiments select the maximum amount of activator at a 5000-fold molar excess Al/M over the catalyst compound (per metal catalytic site). The minimum activator-to-catalyst-compound is typically a 1:1 molar ratio.

B. Ionizing Activators:

It is contemplated to use an ionizing or stoichiometric activator, that is neutral or ionic, such as tri(n-butyl)ammonium tetrakis(pentafluorophenyl)-borate, a trisperfluorophenyl boron metalloid precursor or a trisperfluoro-naphtyl boron metalloid precursor, polyhalogenated heteroborane anions (WO 98/43983), boric acid (U.S. Pat. No. 5,942,459) or combination thereof as an activator herein. Also contemplated for use herein are neutral or ionic activators alone or in combination with aluminoxane or modified aluminoxane activators.

Examples of neutral stoichiometric activators include tri-substituted boron, aluminum, gallium and indium or mixtures thereof. The three substituent groups are each independently selected from alkyls, alkenyls, halogen, substituted alkyls, aryls, arylhalides, alkoxy and halides. The three groups are independently selected from halogen, mono or multicyclic (including halosubstituted) aryls, alkyls, and alkenyl compounds and mixtures thereof, advantageous are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternately, the three groups are alkyls having 1 to 4 carbon groups, phenyl, napthyl or mixtures thereof. Alternately, the three groups are halogenated, advantageously fluorinated, aryl groups. Alternately, the neutral stoichiometric activator is trisperfluorophenyl boron or trisperfluoronapthyl boron.

Ionic stoichiometric activator compounds can contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

C. Non-Ionizing Activators:

Activators are typically strong Lewis-acids which can play either the role of ionizing or non-ionizing activator. Activators previously described as ionizing activators can also be used as non-ionizing activators.

Abstraction of formal neutral ligands can be achieved with Lewis acids that display an affinity for the formal neutral ligands. These Lewis acids are typically unsaturated or weakly coordinated. Examples of non-ionizing activators include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene. Non-ionizing activators also include weakly coordinated transition metal compounds such as low-valent olefin complexes.

Non-limiting examples of non-ionizing activators include $BMe_3$, $BEt_3$, $B(iBu)_3$, $BPh_3$, $B(C_6F_5)_3$, $AlMe_3$, $AlEt_3$, $Al(iBu)_3$, $AlPh_3$, $B(C_6F_5)_3$, aluminoxane, CuCl, Ni(1,5-cyclooctadiene)$_2$.

Additional neutral Lewis-acids are known in the art and will be suitable for abstracting formal neutral ligands. See in particular the review article by E.Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

Suitable non-ionizing activators include $R^{10}(R^{11})_3$, where $R^{10}$ is a group 13 element and $R^{11}$ is a hydrogen, a hydrocarbyl, a substituted hydrocarbyl, or a functional group. In one or more embodiments, $R^{11}$ is an arene or a perfluorinated arene.

Other non-ionizing activators include $B(R^{12})_3$, where $R^{12}$ is an arene or a perfluorinated arene. Illustrative activators can include ionizing and non-ionizing activators based on perfluoroaryl borane and perfluoroaryl borates such as PhNMe$_2$H+ B(C$_6$F$_5$)$_4^-$, (C$_6$H$_5$)$_3$C$^+$ B(C$_6$F$_5$)$_4^-$, and B(C$_6$F$_5$)$_3$. Additional activators that can be used are described in WO 03/064433A1, which is incorporated by reference herein.

Supports

In another embodiment, the catalyst compositions of this disclosure include a support material or carrier. For example, the one or more catalyst components and/or one or more activators can be deposited on, contacted with, vaporized with, bonded to, or incorporated within, adsorbed or absorbed in, or on, one or more supports or carriers.

The support material is any of the conventional support materials. Advantageously, the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The advantageous support materials are inorganic oxides that include those Group 2, 3, 4, 5, 13 or 14 metal oxides. The advantageous supports include silica, which can or can not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. In addition, combinations of these support materials can be used, for example, silica-chromium, silica-alumina, silica-titania and the like. Additional support materials can include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

It is advantageous that the support material, most advantageously an inorganic oxide, has a surface area in the range of from about 10 to about 700 m$^2$/g, pore volume in the range of from about 0 to about 4.0 mL/g and average particle size in the range of from about 0.02 to about 50 μm. More advantageously, the surface area of the support material is in the range of from about 50 to about 500 m$^2$/g, pore volume of from about 0 to about 3.5 cc/g and average particle size of from about 0.02 to about 20 μm. Most advantageously the surface area of the support material is in the range is from about 100 to about 400 m$^2$/g, pore volume from about 0 to about 3.0 mL/g and average particle size is from about 0.02 to about 10 μm.

Non-porous supports can also be used as supports in the processes described herein. For example, in a advantageous embodiment the nonporous, fumed silica supports described in U.S. Pat. No. 6,590,055 can be used.

Additional useful activators for use in the processes of this disclosure include clays that have been treated with acids (such as H$_2$SO$_4$) and then combined with metal alkyls (such as triethylaluminum) as described in U.S. Pat. No. 6,531,552 and EP 1 160 261 A1, which is incorporated by reference herein.

Scavengers

Compounds that destroy impurities without destroying the catalyst are referred to as scavengers by one skilled in the art of polymerization. Impurities can harm catalysts by reducing their activity. Scavengers can be optionally fed to the reactor(s) of the process disclosed herein. Catalytic activity can be defined many different ways. For example, catalytic activity can be expressed as turnover frequency, i.e., the number of moles of monomers converted to the product in a unit time by one mole of catalyst. For a given reactor operating at the same residence time, catalytic activity can also be measured in terms of catalyst productivity, customarily expressed as the weight of polymer made by a unit weight of catalyst.

The scavengers for use in the processes disclosed herein can be different chemical compound(s) from the catalyst activator. Non-limiting exemplary scavengers include alkyl aluminum compounds, such as trimethyl aluminum, triethyl aluminum, tri-isobutyl aluminum, and trioctyl aluminum. The scavenger can also be the same as the catalyst activator and is generally applied in excess of what is needed to fully activate the catalyst. These scavengers include, but are not limited to, aluminoxanes, such as methyl aluminoxane. The scavenger can also be introduced to the reactor with the monomer feed or with any other feed stream. In one particular embodiment, the scavenger is introduced with the monomer-containing feed. The scavenger can be homogeneously dissolved in the polymerization system or can form a separate solid phase. In one particular embodiment, scavengers are dissolved in the polymerization system.

Solvents/Diluents

Advantageous solvents/diluents for use in the present disclosure include one or more of $C_2$ to $C_{24}$ alkanes, advantageously propane, n-butane, isobutane, n-pentane, isopentane, n-hexane, mixed hexanes, isohexane, cyclopentane, cyclohexane, etc., single-ring aromatics, such as toluene and xylenes. In some advantageous embodiments, the diluent comprises one or more of methane, ethane, propane, butane, isobutane, isopentane, and hexanes. In advantageous embodiments, the solvent/diluent is recyclable.

Advantageous diluents also include $C_4$ to $C_{150}$ isoparaffins, advantageously $C_4$ to $C_{100}$ isoparaffins, advantageously $C_4$ to $C_{25}$ isoparaffins, more advantageously $C_4$ to $C_{20}$ isoparaffins. By isoparaffin is meant that the paraffin chains possess $C_1$ to $C_{10}$ alkyl branching along at least a portion of each paraffin chain. More particularly, the isoparaffins are saturated aliphatic hydrocarbons whose molecules have at least one carbon atom bonded to at least three other carbon atoms or at least one side chain (i.e., a molecule having one or more tertiary or quaternary carbon atoms), and advantageously wherein the total number of carbon atoms per molecule is in the range between 6 to 50, and between 10 and 24 in another embodiment, and from 10 to 15 in yet another embodiment. Various isomers of each carbon number will typically be present. The isoparaffins can also include cycloparaffins with branched side chains, generally as a minor component of the isoparaffin. Advantageously, the density (ASTM 4052, 15.6/15.6° C.) of these isoparaffins ranges from 0.65 to 0.83 g/cm$^3$; the pour point is −40° C. or less, advantageously −50° C. or less, the viscosity (ASTM 445, 25° C.) is from 0.5 to 20 cSt at 25° C.; and the weight-averaged molecular weights in the range of 100 to 300 g/mol. Some suitable isoparaffins are commercially available under the trade name ISOPAR (ExxonMobil Chemical Company, Houston Tex.), and are described in, for example, U.S. Pat. Nos. 6,197,285, 3,818,105 and 3,439,088, and sold commercially as ISOPAR series of isoparaffins. Other suitable isoparaffins are also commercially available under the trade names SHELLSOL (by Shell), SOLTROL (by Chevron Phillips) and SASOL (by Sasol Limited). SHELLSOL is a product of the Royal Dutch/Shell Group of Companies, for example Shellsol™ (boiling point range=215-260° C.). SOLTROL is a product of Chevron Phillips Chemical Co. LP, for example SOLTROL 220 (boiling point=233-280° C.). SASOL is a product of Sasol Limited (Johannesburg, South Africa), for example SASOL LPA-210, SASOL-47 (boiling point=238-274° C.).

In another embodiment, advantageous diluents include $C_4$ to $C_{25}$ n-paraffins, advantageously $C_4$ to $C_{20}$ n-paraffins, advantageously $C_4$ to $C_{15}$ n-paraffins having less than 0.1%, advantageously less than 0.01% aromatics. Some suitable n-paraffins are commercially available under the trade name NORPAR (ExxonMobil Chemical Company, Houston Tex.), and are sold commercially as NORPAR series of n-paraffins. In another embodiment, advantageous diluents include dearomaticized aliphatic hydrocarbon comprising a mixture of normal paraffins, isoparaffins and cycloparaffins. Typically they are a mixture of $C_4$ to $C_{25}$ normal paraffins, isoparaffins and cycloparaffins, advantageously $C_5$ to $C_{18}$, advantageously $C_5$ to $C_{12}$. They contain very low levels of aromatic hydrocarbons, advantageously less than 0.1, advantageously less than 0.01 aromatics. Suitable dearomaticized aliphatic hydrocarbons are commercially available under the trade name EXXSOL (ExxonMobil Chemical Company, Houston Tex.), and are sold commercially as EXXSOL series of dearomaticized aliphatic hydrocarbons.

In another embodiment the diluent comprises up to 20 wt % of oligomers of $C_6$ to $C_{14}$ olefins and/or oligomers of linear olefins having 6 to 14 carbon atoms, more advantageously 8 to 12 carbon atoms, more advantageously 10 carbon atoms having a kinematic viscosity of 10 or more (as measured by ASTM D 445); and advantageously having a viscosity index ("VI"), as determined by ASTM D-2270 of 100 or more.

In another embodiment, the diluent comprises up to 20 wt % of oligomers of $C_{20}$ to $C_{1500}$ paraffins, advantageously $C_{40}$ to $C_{1000}$ paraffins, advantageously $C_{50}$ to $C_{750}$ paraffins, advantageously $C_{50}$ to $C_{500}$ paraffins. In another embodiment, the diluent comprises up to 20 wt % of hydrofinished oligomers of 1-pentene, 1-hexene, 1-heptene, 1-octene, 1-nonene, 1-decene, 1-undecene and 1-dodecene. Such oligomers are commercially available as SHF and SuperSyn PAO's (ExxonMobil Chemical Company, Houston Tex.). Other useful oligomers include those sold under the trade names Synfluid™ available from ChevronPhillips Chemical Co. in Pasedena Tex., Durasyn™ available from BP Amoco Chemicals in London England, Nexbase™ available from Fortum Oil and Gas in Finland, Synton™ available from Chemtura Corporation in Middlebury Conn., USA, EMERY™ available from Cognis Corporation in Ohio, USA.

In another embodiment, the diluent comprises a fluorinated hydrocarbon. Advantageous fluorocarbons for use in this disclosure include perfluorocarbons ("PFC" or "PFC's") and or hydrofluorocarbons ("HFC" or "HFC's"), collectively referred to as "fluorinated hydrocarbons" or "fluorocarbons" ("FC" or "FC's"). Fluorocarbons are defined to be compounds consisting essentially of at least one carbon atom and at least one fluorine atom, optionally hydrogen atom(s). A perfluorocarbon is a compound consisting essentially of carbon atom and fluorine atom, and includes for example linear branched or cyclic, $C_1$ to $C_{40}$ perfluoroalkanes. A hydrofluorocarbon is a compound consisting essentially of carbon, fluorine and hydrogen. Advantageous FC's include those represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most advantageously from 1 to 3, wherein y is an integer greater than or equal to 0 and z is an integer and at least one, more advantageously, y and z are integers and at least one. For purposes of this disclosure and the claims thereto, the terms hydrofluorocarbon and fluorocarbon do not include chlorofluorocarbons.

With regard to the polymerization system, advantageous diluents and solvents are those that are soluble in and inert to the monomer and any other polymerization components at the polymerization temperatures and pressures used.

Polymerization Process Configuration

One or more reactors in series or in parallel can be used. The catalyst compound and activator can be delivered as a solution or slurry, either separately to the reactor, activated in-line just prior to the reactor, or preactivated and pumped as an activated solution or slurry to the reactor. An advantageous operation is two solutions activated in-line. Polymerizations are carried out in either single reactor operation, in which monomer, monomers, catalyst/activator, scavenger, and optional modifiers are added continuously to a single reactor or in series reactor operation, in which the above components are added to each of two or more reactors connected in series. The catalyst components can be added to the first reactor in the series. The catalyst component can also be added to both reactors, with one component being added to first reaction and another component to other reactors.

In one or more embodiments, polymerization can occur in high-pressure reactors where, advantageously, the reactor is substantially unreactive with the polymerization reaction components and is able to withstand the high pressures and temperatures that occur during the polymerization reaction. Such reactors are known as high-pressure reactors for purposes of this disclosure. Withstanding these high pressures and temperatures will allow the reactor to maintain the polymerization system in its homogeneous condition. Suitable reaction vessels include those known in the art to maintain high-pressure polymerization reactions. Suitable reactors are selected from autoclave, pump-around loop or autoclave, tubular, and autoclave/tubular reactors, among others.

Autoclave reactors can be operated in batch or continuous mode. To provide better productivity, and thus to lower production cost, continuous operation is advantageous in commercial operations. Tubular reactors always operate in continuous mode. Typically, autoclave reactors have length-to-diameter ratios of 1:1 to 20:1 and are fitted with a high-speed (up to 2000 RPM) multiblade stirrer. Commercial autoclave pressures are typically greater than 50 atm with a maximum of typically less than 200 atm. The maximum pressure of commercial autoclaves, however, can increase with advances in mechanical engineering and material science. When the autoclave has a low length-to-diameter ratio (such as less than four), the feed streams are typically injected at only one position along the length of the reactor. Reactors with large length-to-diameter ratios can have multiple injection ports at nearly the same position along the length of the reactor but radially distributed to allow for faster intermixing of the feed components with the polymerization system. In the case of stirred tank reactors, the separate introduction of the catalyst is possible and often advantageous. Such introduction prevents the possible formation of hot spots in the unstirred feed zone between the mixing point and the stirred zone of the reactor. Injections at two or more positions along the length of the reactor are also possible and sometimes advantageous. For instance, in reactors where the length-to-diameter ratio is around 4-20, the reactor advantageously can contain up to six different injection positions. Additionally, in the larger autoclaves, one or more lateral fixing devices support the high-speed stirrer. These fixing devices can also divide the autoclave into two or more zones. Mixing blades on the stirrer can differ from zone to zone to allow for a different degree of plug flow and back mixing, largely independently, in the separate zones. Two or more autoclaves with one or more zones can connect in series cascade to increase residence time or to tailor polymer structure. A series reactor cascade consists of two or more reactors connected in series, in which the effluent of at least one upstream reactor is fed to the next reactor downstream in the cascade. Besides the effluent of the upstream reactor(s), the feed of any reactor in the series cascade can be augmented with any combination of additional monomer, catalyst, or solvent fresh or recycled feed streams. Two or more reactors can also be arranged in a parallel configuration. The individual arms of such parallel arrangements are called reactor trains. These reactor trains in turn can themselves comprise one reactor or a reactor series cascade creating a combination of series and parallel reactors.

Tubular reactors are also well suited for use in this disclosure, advantageously tubular reactors capable of operating up to about 3000 atm. Advantageous tubular reactors are fitted with external cooling and one or more injection points along the (tubular) reaction zone. As in autoclaves, these injection points serve as entry points for monomers (such as propylene), one or more monomer, catalyst, or mixtures of these. Advantageously, the flow regime in a tubular reactor is not laminar and the flow rates are high enough to exceed a Reynolds number value of 2000. When the Reynolds number exceeds 2000, the flow becomes increasingly turbulent. Typically, flows characterized by Reynolds number values of 4000 or more are completely turbulent. Flow turbulence facilitates the development of a "flat" fluid flow front with nearly identical flow rates and thus affords nearly identical residence time of reagents passing through the tube reactor. Turbulence also reduces heat transfer resistance thus affords better heat removal from and more even temperature profile in the reactor. The role of turbulence and its effects on residence time distribution, heat transfer, etc., are well known in the art of chemical engineering. In tubular reactors, external cooling allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Another way of addressing wall deposits is to fabricate the tube with smooth, unpolished internal surfaces. Advantageous tubular reactors can operate at pressures up to 3000 atm and advantageously have lengths of 100-4000 meters and internal diameters usually less than 12.5 cm thus sometimes have length/diameter ratios over 40,000.

Reactor trains that pair autoclaves with tubular reactors can also serve in disclosure processes. In such instances, the autoclave typically precedes the tubular reactor or the two types of reactors form separate trains of a parallel reactor configuration. Such systems can have injection of additional catalyst and/or feed components at several points in the autoclave and more particularly along the tube length.

In both autoclaves and tubular reactors, at injection, feeds are advantageously cooled to near ambient temperature or below to provide maximum cooling and thus maximum polymer production within the limits of maximum operating temperature. In autoclave operation, a preheater operates at startup, but not after the reaction reaches steady state if the first mixing zone has some back-mixing characteristics. In tubular reactors, the first section of double-jacketed tubing is heated rather than cooled and is operated continuously. A well-designed tubular reactor is characterized as plug flow. Plug flow is a flow pattern with minimal radial flow rate differences. In both multizone autoclaves and tubular reactors, catalyst can be injected at the inlet, and optionally at one or more points along the reactor. The catalyst feeds injected at the inlet and other injection points can be the same or different in terms of content, density, concentration, etc. Choosing different catalyst feeds allows polymer design tailoring.

In addition to autoclave reactors, tubular reactors, or a combination of these reactors, loop-type reactors are useful in this disclosure. In this reactor type, monomer enters and polymer exits continuously at different points along the loop, while an in-line pump continuously circulates the contents (reaction liquid). The feed/product takeoff rates control total average residence time. A cooling jacket removes reaction heat from the loop.

In general, feed inlet temperatures are generally near to or below ambient temperatures to provide cooling to the exothermic reaction in the reactor operating above the crystallization temperature of the polymer product.

The processes described herein can have residence times as short as 0.5 seconds and as long as an hour. In advantageous embodiments, the residence times are from 10 seconds to 60 minutes, advantageously from 15 seconds to 30 minutes, more advantageously from 30 seconds to 30 minutes, more advantageously from 2 minutes to 30 minutes. In some embodiments, the residence time can be selected from 10, 30, 45, 50 seconds, 1, 5, 10, 15, 20, 25, 30 and 60 minutes. Practical maximum residence times can be selected from 5, 10, 15, 30, 60 minutes. In general, disclosure processes choose residence times of from 1 minute to 60 minutes; more particularly 2 minutes to 30 minutes.

Dividing the total quantity of polymer that is collected during the reaction time by the amount of monomer added to the reaction yields the conversion rate. The monomer-to-polymer conversion rate for the described processes can be as high as 90%. For practical reasons, for example for limiting viscosity, lower conversions could be advantageous. In addition, for practical reasons, for example for limiting the cost of monomer recycle, minimum conversions could be advantageous. Thus, the process can be run at practical conversion rates of 80, 60 or less percent, 3-80, 5-80, 10-70, 15-70, 20-70, 25-60, 3-60, 5-60, 10-60, 15-60, 20-60, 10-50, 5-40, 10-40, 40-50, 15-40, 20-40, or 30-40 percent conversion, advantageously greater than 10, or greater than 20 percent conversion.

EXAMPLES

The following examples (one comparative and one inventive) are prophetic based on theoretical calculations and serve to illustrate one or more advantages of the processes for feeding ethylene into a polymerization system operating in a liquid phase or supercritical phase ethylene disclosed herein.

For the purposes of the examples, a continuous polymerization reactor making an ethylene-propylene copolymer that requires 10,000 kg/hr feed comprising 20 wt % ethylene and 80 wt % propylene. The reaction is to take place in neat (also referred to as bulk) monomer at 700 atm/70 MPa (10150 psi), where the monomer blend becomes a good solvent for the copolymer. Both monomers are available at 70 atm/7 MPa (1015 psi) pressure and 35° C. The adiabatic efficiency of each compression or pumping unit operation is considered to be 90%.

Comparative Example

Figure 1:
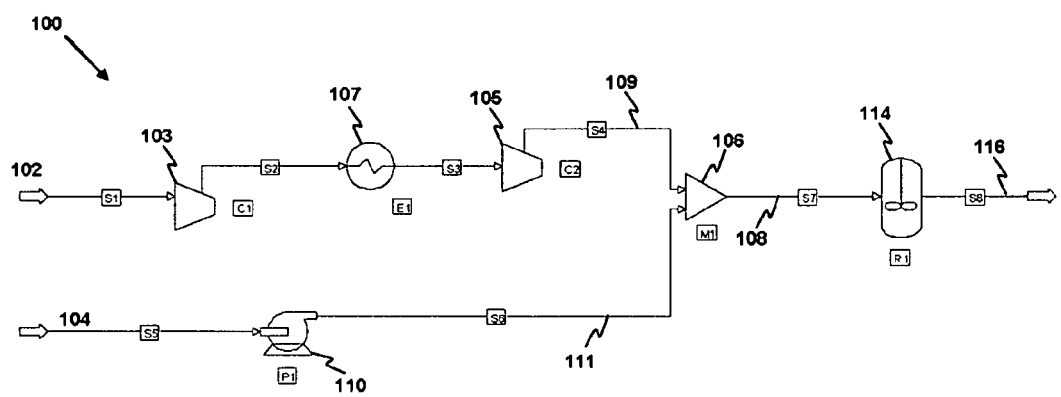
FIG. 1 depicts a prior art process schematic for feeding ethylene monomer to a polymerization reactor in gaseous form using two compressors.

FIG. 1 depicts a prior art process schematic 100 for feeding ethylene monomer to a polymerization reactor in gaseous form using two compressors. Referring to FIG. 1, a low-pressure ethylene feed stream 102 passes through a stage 1 compressor 103, then a heat exchanger 107 to remove the heat generated during the work of compression, and then a stage 2 compressor 105 to form a high-pressure ethylene stream 109. A low-pressure propylene stream 104 is pressurized with a high-pressure pump 110 to form a high-pressure propylene stream 111. The high-pressure ethylene stream 109 and the high-pressure propylene stream 111 are combined at a blending point 106 to form a high-pressure ethylene-carrying blended reactor feed stream 108. The ethylene-carrying high-pressure blended reactor feed stream 108 is then fed to a stirred tank reactor 114. The ethylene-propylene copolymer containing reactor effluent stream 116 then emerges from the stirred tank reactor 114 for further downstream processing.

The ethylene stream 102 is compressed from 70 atm/7 MPa (1015 psi) to 70 MPa (10150 psi) in two stages with the two compressors 103, 105. It is not considered safe to compress ethylene under these conditions in a single stage, because the heat of compression would result in discharge temperatures exceeding ~120° C., which is the level considered maximum for preventing the runaway exothermic decomposition of ethylene. With two stage compression, the maximum discharge temperature is 105° C. The propylene stream 104 is pumped from 70 atm/7 MPa (1015 psi) to 70 MPa (10150 psi) in a single pumping stage with the high pressure pump 110. Propylene is much less compressible than ethylene at these conditions, and single pumping stage results in a temperature rise from 35 to just 73° C. The total energy required for running the two compressors 103, 105 and one high-pressure pump 110 for feeding the combined stream to the stirred tank reactor 114 as calculated in the table below is 400 kW.

Ethylene and Propylene Feed Energy for Prior Art Process:

| | | Stream Name Stream Description | | | | | | |
|---|---|---|---|---|---|---|---|---|
| | | S1 Ethylene | S2 C1 Disch | S3 C2 Suct | S4 C2 Disch | S5 Propylene | S6 P1 Disch | S7 Combined Feed |
| Phase | | Vapor | Vapor | Liquid | Liquid | Liquid | Liquid | Liquid |
| Temperature | deg C. | 35.000 | 105.865 | 35.000 | 77.249 | 35.000 | 72.593 | 72.978 |
| Pressure | kPa | 7000.000 | 22000.000 | 22000.000 | 70000.000 | 7000.000 | 70000.000 | 70000.000 |
| Total Molecular Weight | | 28.054 | 28.054 | 28.054 | 28.054 | 42.081 | 42.081 | 40.077 |
| Flow rate | kmol/hr | 35.646 | 35.646 | 35.646 | 35.646 | 213.875 | 213.875 | 249.521 |
| Flow rate | kg/hr | 1000.000 | 1000.000 | 1000.000 | 1000.000 | 9000.000 | 9000.000 | 10000.000 |
| Composition | | | | | | | | |
| ETHENE | | 1.000 | 1.000 | 1.000 | 1.000 | 0.000 | 0.000 | 0.143 |
| PROPENE | | 0.000 | 0.000 | 0.000 | 0.000 | 1.000 | 1.000 | 0.857 |
| EICOSENE1 | | 0.000 | 0.000 | 0.000 | 0.000 | 0.000 | 0.000 | 0.000 |

| | | Compressor Name Compressor Description | | | | Pump Name Pump Description |
|---|---|---|---|---|---|---|
| | | C1 | C2 | | | P1 |
| Pressure | kPa | 22000.0000 | 70000.000 | Pressure Gain | kPa | 63000.0000 |
| Temperature | deg C. | 105.8650 | 77.2490 | Head | M | 12635.7852 |
| Head | M | 7714.0103 | 12788.2188 | Work | kW | 343.9742 |
| Actual Work | kW | 21.0207 | 34.8479 | | | |
| Isentropic coef., k | | 2.0346 | 7.9719 | | | |

Inventive Example

Referring again to FIG. 2 and utilizing propylene for the $C_3$ to $C_{20}$ monomer stream 4, the energy required to feed the ethylene and propylene to the stirred tank reactor 14 at the same conditions as the comparative example above (a continuous polymerization reactor making an ethylene-propylene copolymer that requires 10,000 kg/hr feed comprising 20 wt % ethylene and 80 wt % propylene) may be calculated.

The low-pressure ethylene stream 2 and low-pressure propylene stream 4 are mixed in-line at that the blending point 6 at a 70 atm/7 MPa (1015 psi) pressure level, resulting in a single liquid phase stream at 40° C. The resulting low-pressure ethylene-propylene mixture 108 is pumped in a single stage high-pressure pump 10 up to 700 atm/70 MPa (10150 psi). The temperature of the high-pressure ethylene-propylene mixture 12 rises to 83° C. across this pump. The total energy required for feeding the combined high-pressure ethylene-propylene stream to the stirred tank reactor 14 as calculated in the table below is 404 kW.

Ethylene and Propylene Feed Energy for Inventive Process Embodiment:

|  |  | Stream Name / Stream Description | | | | | | |
|---|---|---|---|---|---|---|---|---|
|  |  | S1 Ethylene | S2 C1 Disch | S3 C2 Suct | S4 C2 Disch | S5 Propylene | S6 P1 Disch | S7 Combined Feed |
| Phase |  | Vapor | Vapor | Liquid | Liquid | Liquid | Liquid | Liquid |
| Temperature | deg C. | 35.000 | 105.865 | 35.000 | 77.249 | 35.000 | 72.593 | 72.978 |
| Pressure | kPa | 7000.000 | 22000.000 | 22000.000 | 70000.000 | 7000.000 | 70000.000 | 70000.000 |
| Total Molecular Weight |  | 28.054 | 28.054 | 28.054 | 28.054 | 42.081 | 42.081 | 40.077 |
| Flow rate | kmol/hr | 35.646 | 35.646 | 35.646 | 35.646 | 213.875 | 213.875 | 249.521 |
| Flow rate | kg/hr | 1000.000 | 1000.000 | 1000.000 | 1000.000 | 9000.000 | 9000.000 | 10000.000 |
| Composition |  |  |  |  |  |  |  |  |
| ETHENE |  | 1.000 | 1.000 | 1.000 | 1.000 | 0..000 | 0.000 | 0.143 |
| PROPENE |  | 0.000 | 0.000 | 0.000 | 0.000 | 1.000 | 1.000 | 0.857 |
| EICOSENE1 |  | 0.000 | 0.000 | 0.000 | 0.000 | 0.000 | 0.000 | 0.000 |

|  |  | Compressor Name / Compressor Description | | | | Pump Name / Pump Description | |
|---|---|---|---|---|---|---|---|
|  |  | C1 | C2 |  |  | P1 | |
| Pressure | kPa | 22000.0000 | 70000.000 | Pressure Gain | kPa | 63000.0000 | |
| Temperature | deg C. | 105.8650 | 77.2490 | Head | M | 12635.7852 | |
| Head | M | 7714.0103 | 12788.2188 | Work | kW | 343.9742 | |
| Actual Work | kW | 21.0207 | 34.8479 |  |  |  | |
| Isentropic coef., k |  | 2.0346 | 7.9719 |  |  |  | |

The comparative example and the inventive example discussed above illustrate how the process for feeding ethylene into a polymerization system operating in a liquid phase or supercritical phase disclosed herein simplifies the feeding of ethylene to a copolymerization reactor operating in a liquid phase or supercritical phase. In particular, the number of rotating machinery unit operations was reduced from three to one while the energy required to pressurize the feed stocks was essentially the same. The operation of rotating machinery, like compressors, is characterized by relatively high maintenance time resulting in production losses and increased maintenance cost.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" of the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present disclosure, other and further embodiments of the disclosure can be devised without departing from the basic scope thereof, and the scope thereof is determined by the claims that follow.

What is claimed is:

1. A process for feeding ethylene into a polymerization system operating in a liquid phase or supercritical phase comprising:

providing a low-pressure ethylene stream, one or more low-pressure $C_3$ to $C_{20}$ monomer streams, a low-pressure ethylene-depleted recycle stream, an optional low-pressure inert solvent/diluent stream, and one or more reactors configured in parallel, in series, or a combination thereof;

metering the low-pressure ethylene stream, the one or more low-pressure $C_3$ to $C_{20}$ monomer streams, a low-pressure ethylene-depleted recycle stream, and the optional low-pressure inert solvent/diluent stream;

blending upstream of the one or more reactors the metered low-pressure ethylene stream, the metered one or more low-pressure $C_3$ to $C_{20}$ monomer streams, the low-pressure ethylene-depleted recycle stream, and the metered low-pressure optional inert solvent/diluent stream to form an ethylene-carrying low-pressure blended liquid feed stream;

pressurizing the ethylene-carrying low-pressure blended liquid feed stream to the polymerization system pressure with one or more high-pressure pumps to form an ethylene-carrying high-pressure blended reactor feed stream; and feeding the ethylene-carrying high-pressure blended reactor feed stream to the one or more reactors configured in parallel, in series, or a combination thereof.

2. The process of claim 1, wherein the metering of the low-pressure ethylene stream is carried out with one or more mass flow controllers.

3. The process of claim 1, wherein the metering of the one or more low-pressure $C_3$ to $C_{20}$ monomer streams, and the optional low-pressure inert solvent/diluent stream is carried out with one or more mass flow controllers, one or more metering pumps, or a combination thereof.

4. The process of claim 1, wherein the metered low-pressure ethylene feed stream comprises from 0.1 to 70 wt% of the ethylene-carrying low-pressure blended liquid feed stream.

5. The process of claim 4, wherein the metered low-pressure ethylene feed stream comprises from 1 to 50 wt% of the ethylene-carrying low-pressure blended liquid feed stream.

6. The process of claim 1, wherein the pressure of the ethylene-carrying low-pressure blended liquid feed stream is greater than or equal to its bubble point pressure.

7. The process of claim 6, wherein the pressure of the ethylene-carrying low-pressure blended liquid feed stream is at least 5 atmospheres greater than its bubble point pressure.

8. The process of claim 1, wherein the temperature of the ethylene-carrying low-pressure blended liquid feed stream is less than or equal to its boiling point temperature.

9. The process of claim 8, wherein the temperature of the ethylene-carrying low-pressure blended liquid feed stream is at least 10° C. less than its boiling point temperature.

10. The process of claim 1, wherein the low-pressure optional inert solvent/diluent stream is chosen from the group consisting of $C_4$ to $C_{20}$ saturated aliphatic hydrocarbons, aromatic hydrocarbons and combinations thereof.

11. The process of claim 10, wherein the $C_4$ to $C_{20}$ saturated aliphatic hydrocarbons are chosen from the group consisting of petrol ether, butanes, pentanes, hexanes, heptanes, octanes, cyclohexane, and combinations thereof.

12. The process of claim 10, wherein the aromatic hydrocarbon is toluene.

13. The process of claim 1 further including providing a low-pressure recycle stream, metering the tow-pressure recycle stream; increasing the pressure of the metered low-pressure recycle stream to the polymerization system pressure with one or more high-pressure pumps; and feeding the high-pressure metered recycle stream to the one or more reactors configured in parallel, in series, or a combination thereof; and wherein the metering of the low-pressure ethylene-depleted recycle stream is carried out with one or more mass flow controllers, one or more metering pumps, or a combination thereof.

14. The process of claim 1, wherein the one or more reactors configured in parallel, in series, or a combination thereof are chosen from the group consisting of tubular, stirred tank, loop, and combinations thereof.

15. The process of claim 1, wherein the one or more low-pressure $C_3$ to $C_{20}$ monomer streams are chosen from the group consisting of propylene, butene-1, butene-2, isobutylene, pentene-1, hexene-1, heptene-1, octene-1, decene-1, styrene, o-methylstyrene, p-methylstyrene, 1,3-butadiene, 1,5-hexadiene, 1,7-octadiene, 1,9-decadiene, divinylbenzene, dicyclopentadiene, norbornene, norbornadiene, vinylnorbornene, ethylidenenorbornene, and combinations thereof.

16. The process of claim 15, wherein the one or more low-pressure $C_3$ to $C_{20}$ monomer streams is propylene.

17. The process of claim 1 further including feeding one or more catalyst system streams to the one or more reactors configured in parallel, in series, or a combination thereof.

18. The process of claim 17, wherein the one or more catalyst system streams comprise one or more catalysts chosen from the group consisting of Ziegler-Natta catalysts, metallocene catalysts, nonmetallocene metal-centered, heteroaryl ligand catalysts, and late transition metal catalysts.

19. The process of claims 17, wherein the one or more catalyst system streams comprise one or more activators chosen from the group consisting of aluminoxane activators, aluminum alkyl activators, ionizing activators, non-ionizing activators, non-coordinating borate activators, and combinations thereof.

20. The process of claims 17, wherein the one or more catalyst system streams comprise one or more catalyst supports chosen from the group consisting of talcs, inorganic oxides, and inorganic chlorides, polystyrene, polystyrene divinyl benzene polyolefins, zeolites, clays, inorganic oxides, silica, fumed silica, alumina, silica-alumina, magnesia, titania, zirconia, magnesium chloride, montmorillonite phyllosilicate, porous acrylic polymers, nanocomposites, spherulites, polymeric beads and combinations thereof.

21. The process of claim 1, wherein the blending of the low-pressure ethylene stream, the one or more low-pressure $C_3$ to $C_{20}$ monomer streams, a low-pressure ethylene-depleted recycle stream, and the optional low-pressure inert solvent/diluent stream occurs at a blending point chosen from the group consisting of process piping, a tank, a heat exchanger, and combinations thereof.

22. The process of claim 21, wherein the tank includes cooling coils coupled to a heat exchanger.

23. The process of claim 21, wherein the tank includes a stirrer.

24. The process of claim 21, wherein the process piping at or downstream of the blending point includes one or more static mixers.

25. The process of claim 1, wherein the ethylene-carrying high-pressure blended reactor feed stream is stored in a buffer tank prior to feeding to the one or more reactors configured in parallel, in series, or a combination thereof.

26. The process of claim 1, wherein the low-pressure ethylene stream, the one or more low-pressure $C_3$ to $C_{20}$ monomer streams, and the optional low-pressure inert solvent/diluent stream are at pressures ranging from 2 atm. to 400 atm.

27. The process of claim 1, wherein the one or more reactors configured in parallel, in series, or a combination thereof operate at a pressure ranging from 100 atm. to 2000 atm.

28. The process of claim 1, wherein the ratio of the pressures of the ethylene-carrying high-pressure blended reactor feed stream and the ethylene-carrying low-pressure blended liquid feed stream ranges from 5 to 50.

29. The process of claim 1, wherein the one or more reactors configured in parallel, in series, or a combination thereof operate within process regimes chosen from the group consisting of solution, advanced solution, supercritical and combinations thereof.

30. A process for feeding ethylene into a polymerization system operating in a liquid phase or supercritical phase comprising:

providing a low-pressure ethylene stream, one or more low-pressure $C_3$ to $C_{20}$ monomer streams ethylene-depleted, a low-pressure recycle stream an optional low-pressure inert solvent/diluent stream, and one or more reactors configured in parallel, in series, or a combination thereof;

metering the low-pressure ethylene stream, the one or more low-pressure $C_3$ to $C_{20}$ monomer streams ethylene-depleted, the low-pressure recycle stream, and the optional low-pressure inert solvent/diluent stream;

blending upstream of the one or more reactors the metered low-pressure ethylene stream, the metered one or more low-pressure $C_3$ to $C_{20}$ monomer streams, the metered low-pressure ethylene-depleted recycle stream and the metered optional inert solvent/diluent stream to form an ethylene-carrying low-pressure blended liquid feed stream;

pressurizing the ethylene-carrying low-pressure blended liquid feed stream to the polymerization system pressure with one or more high-pressure pumps to form an ethylene-carrying high-pressure blended reactor feed stream; and feeding the ethylene-carrying high-pressure blended reactor feed stream to the one or more reactors configured in parallel, in series, or a combination thereof.

31. The process of claim 30, wherein the metering of the low-pressure ethylene stream is carried out with one or more mass flow controllers.

32. The process of claim 30, wherein the metering of the one or more low-pressure $C_3$ to $C_{20}$ monomer streams, the low-pressure recycle stream, and the optional low-pressure inert solvent/diluent stream is carried out with one or more mass flow controllers, one or more metering pumps, or a combination thereof.

33. The process of claim 30, wherein the metered low-pressure ethylene monomer feed stream comprises from 0.1 to 70 wt% of the ethylene-carrying low-pressure blended liquid feed stream.

34. The process of claim 33, wherein the metered low-pressure ethylene monomer feed stream comprises from 1 to 50 wt% of the ethylene-carrying low-pressure blended liquid feed stream.

35. The process of claim 30, wherein the pressure of the ethylene-carrying low-pressure blended liquid feed stream is greater than or equal to its bubble point pressure.

36. The process of claim 35, wherein the pressure of the ethylene-carrying low-pressure blended liquid feed stream is at least 5 atmospheres greater than its bubble point pressure.

37. The process of claim 30, wherein the temperature of the ethylene-carrying low-pressure blended liquid feed stream is less than or equal to its boiling point temperature.

38. The process of claim 37, wherein the temperature of the ethylene-carrying low-pressure blended liquid feed stream is at least 10° C. less than its boiling point temperature.

39. The process of claim 30, wherein the low-pressure optional inert solvent/diluent stream is chosen from the group consisting of $C_4$ to $C_{20}$ saturated aliphatic hydrocarbons, aromatic hydrocarbons and combinations thereof.

40. The process of claim 39, wherein the $C_4$ to $C_{20}$ saturated aliphatic hydrocarbons are chosen from the group consisting of petrol ether, butanes, pentanes, hexanes, heptanes, octanes, cyclohexane, and combinations thereof.

41. The process of claim 39, wherein the aromatic hydrocarbon is toluene.

42. The process of claim 30, wherein the one or more reactors configured in parallel, in series, or a combination thereof are chosen from the group consisting of tubular, stirred tank, loop, and combinations thereof.

43. The process of claim 30, wherein the one or more low-pressure $C_3$ to $C_{20}$ monomer streams are chosen from the group consisting of propylene, butenes, butene-1, butene-2, isobutylene, pentene-1, hexene-1, heptene-1, octene-1, decene-1, styrene, o-methylstyrene, p-methylstyrene, 1,3-butadiene, 1,5-hexadiene, 1,7-octadiene, 1,9-decadiene, divinylbenzene, dicyclopentadiene, norbornene, norbornadiene, vinylnorbornene, ethylidenenorbornene, and combinations thereof.

44. The process of claim 43, wherein the one or more low-pressure $C_3$ to $C_{20}$ monomer streams is propylene.

45. The process of claim 30 further including feeding one or more catalyst systems to the one or more reactors configured in parallel, in series, or a combination thereof.

46. The process of claim 45, wherein the one or more catalyst system streams comprise one or more catalysts chosen from the group consisting of Ziegler-Natta catalysts, metallocene catalysts, nonmetallocene metal-centered, heteroaryl ligand catalysts, and late transition metal catalysts.

47. The process of claims 45, wherein the one or more catalyst system streams comprise one or more activators chosen from the group consisting of aluminoxane activators, aluminum alkyl activators, ionizing activators, non-ionizing activators, non-coordinating borate activators, and combinations thereof.

48. The process of claims 45, wherein the one or more catalyst system streams comprise one or more catalyst supports chosen from the group consisting of talcs, inorganic oxides, and inorganic chlorides, polystyrene, polystyrene divinyl benzene polyolefins, zeolites, clays, inorganic oxides, silica, fumed silica, alumina, silica-alumina, magnesia, titania, zirconia, magnesium chloride, montmorillonite phyllosilicate, porous acrylic polymers, nanocomposites, spherulites, polymeric beads and combinations thereof.

49. The process of claim 30, wherein the blending of the low-pressure ethylene stream, the one or more low-pressure $C_3$ to $C_{20}$ monomer streams, the low-pressure ethylene-depleted recycle stream, and the optional low-pressure inert solvent/diluent stream occurs at a blending point chosen from the group consisting of process piping, a tank, a heat exchanger, and combinations thereof.

50. The process of claim 49, wherein the tank includes cooling coils coupled to a heat exchanger.

51. The process of claim 49, wherein the tank includes a stirrer.

52. The process of claim 49, wherein the process piping at or downstream of the blending point includes one or more static mixers.

53. The process of claim 30, wherein the ethylene-carrying high-pressure blended reactor feed stream is stored in a buffer tank prior to feeding to the one or more reactors configured in parallel, in series, or a combination thereof.

54. The process of claim 30, wherein the low-pressure ethylene stream, the one or more low-pressure $C_3$ to $C_{20}$ monomer streams, the low-pressure recycle stream, and the optional low-pressure inert solvent/diluent stream are at pressures ranging from 2 atm. to 400 atm.

55. The process of claim 30, wherein the one or more reactors configured in parallel, in series, or a combination thereof operate at a pressure ranging from 100 atm. to 2000 atm.

56. The process of claim 1, wherein the ratio of the pressures of the ethylene-carrying high-pressure blended reactor feed stream and the ethylene-carrying low-pressure blended liquid feed stream ranges from 5 to 50.

57. The process of claim 30, wherein the one or more reactors configured in parallel, in series, or a combination thereof operate within process regimes chosen from the group consisting of solution, advanced solution, supercritical and combinations thereof.

* * * * *